United States Patent
Kumar et al.

(10) Patent No.: US 9,832,151 B2
(45) Date of Patent: Nov. 28, 2017

(54) AGGREGATE ELECTRONIC MAIL MESSAGE HANDLING

(71) Applicants: Ankesh Kumar, Palo Alto, CA (US); Yogesh Gowdra, Sunnyvale, CA (US)

(72) Inventors: Ankesh Kumar, Palo Alto, CA (US); Yogesh Gowdra, Sunnyvale, CA (US)

(73) Assignee: Socialmail LLC, Palo Alto, CA (US)

( * ) Notice: Subject to any disclaimer, the term of this patent is extended or adjusted under 35 U.S.C. 154(b) by 0 days.

(21) Appl. No.: 13/712,870

(22) Filed: Dec. 12, 2012

(65) Prior Publication Data

US 2015/0032824 A1    Jan. 29, 2015

(51) Int. Cl.
| | |
|---|---|
| G06Q 10/10 | (2012.01) |
| G06Q 30/02 | (2012.01) |
| H04L 12/58 | (2006.01) |
| G06F 17/30 | (2006.01) |
| H04L 29/06 | (2006.01) |
| H04L 29/08 | (2006.01) |
| G06F 3/0482 | (2013.01) |
| G06F 17/27 | (2006.01) |

(52) U.S. Cl.
CPC ............ H04L 51/22 (2013.01); G06F 3/0482 (2013.01); G06Q 30/0251 (2013.01); H04L 12/5825 (2013.01); H04L 51/04 (2013.01); H04L 51/32 (2013.01); H04L 65/403 (2013.01); H04L 67/22 (2013.01); G06F 17/272 (2013.01); G06F 2203/04803 (2013.01); H04L 67/02 (2013.01); H04L 67/26 (2013.01)

(58) Field of Classification Search
CPC ................ H04L 12/5825; H04L 67/38; H04L 51/00–51/38; H04L 12/58–12/588; G06Q 10/10–10/1097; G06Q 30/02–30/0611; G06F 9/4443; G06F 17/235–17/2745; G06F 17/30017–17/30905
USPC .............. 709/204, 206, 207; 705/3; 715/862
See application file for complete search history.

(56) References Cited

U.S. PATENT DOCUMENTS

| | | | | |
|---|---|---|---|---|
| 6,146,026 | A  * | 11/2000 | Ushiku .......................... | 709/207 |
| 6,684,239 | B1 * | 1/2004 | Flepp et al. .................. | 709/206 |
| 7,032,030 | B1 * | 4/2006 | Codignotto .......... | G06Q 10/107 707/999.01 |
| 7,222,156 | B2 * | 5/2007 | Gupta et al. .................. | 709/206 |

(Continued)

OTHER PUBLICATIONS

"Facebook tests notification unsubscribe button for feed posts", online article by Josh Constine, Aug. 9, 2010.*

(Continued)

Primary Examiner — Wing F Chan
Assistant Examiner — Raji Krishnan
(74) Attorney, Agent, or Firm — Kokka & Backus, PC

(57) ABSTRACT

Techniques for aggregating electronic mail messages are described, including receiving electronic mail associated with a domain, the electronic mail including multiple messages, each message indicating a address being associated with an account, identifying the account with which the address is associated, generating a clean version of each message, the clean version including a subject and a body of a message, and publishing the clean version on a shared environment, including displaying at least a portion of the clean version in the shared environment, the shared environment accessible using access information associated with the account.

19 Claims, 13 Drawing Sheets

(56) References Cited

U.S. PATENT DOCUMENTS

| | | | |
|---|---|---|---|
| 7,606,865 B2* | 10/2009 | Kumar et al. ............... 709/206 | |
| 8,082,308 B1 | 12/2011 | Filev | |
| 8,615,442 B1* | 12/2013 | Kapur et al. ............... 705/26.1 | |
| 8,892,524 B1* | 11/2014 | Lee ................. G06F 17/30073 | |
| | | | 707/665 |
| 9,143,478 B2* | 9/2015 | Ramaswamy .... G06F 17/30876 | |
| 9,521,100 B2 | 12/2016 | Kumar et al. | |
| 2002/0010746 A1* | 1/2002 | Jilk, Jr. .............. G06F 17/3089 | |
| | | | 709/206 |
| 2002/0049793 A1* | 4/2002 | Okumura ........... G06F 17/2745 | |
| | | | 715/256 |
| 2002/0105545 A1* | 8/2002 | Carter ................. G06F 3/0481 | |
| | | | 715/752 |
| 2003/0135565 A1 | 7/2003 | Estrada | |
| 2003/0225850 A1* | 12/2003 | Teague .......................... 709/207 | |
| 2006/0129602 A1* | 6/2006 | Witriol ................ G06Q 10/107 | |
| 2006/0143307 A1* | 6/2006 | Codignotto ......... G06Q 10/107 | |
| | | | 709/246 |
| 2006/0155581 A1* | 7/2006 | Eisenberger et al. ............. 705/3 | |
| 2006/0206578 A1 | 9/2006 | Heidloff et al. | |
| 2008/0005284 A1* | 1/2008 | Ungar et al. .................. 709/219 | |
| 2008/0103906 A1 | 5/2008 | Singh | |
| 2008/0120379 A1 | 5/2008 | Malik | |
| 2008/0126476 A1 | 5/2008 | Nicholas et al. | |
| 2008/0178125 A1* | 7/2008 | Elsbree et al. ................ 715/862 | |
| 2008/0263603 A1 | 10/2008 | Murray et al. | |
| 2009/0013043 A1 | 1/2009 | Tan | |
| 2009/0043852 A1 | 2/2009 | Weir et al. | |
| 2009/0157708 A1 | 6/2009 | Bandini et al. | |
| 2009/0300036 A1 | 12/2009 | Nagasaki | |
| 2010/0082503 A1* | 4/2010 | Kantak et al. ................ 705/400 | |
| 2010/0250683 A1 | 9/2010 | Hoyne et al. | |
| 2010/0274732 A1* | 10/2010 | Grinchenko ........ G06F 21/6218 | |
| | | | 705/317 |
| 2011/0055217 A1* | 3/2011 | Kamel .............. G06F 17/30867 | |
| | | | 707/741 |
| 2011/0055264 A1* | 3/2011 | Sundelin ............. G06Q 10/107 | |
| | | | 707/776 |
| 2011/0119593 A1 | 5/2011 | Jacobson et al. | |
| 2011/0219087 A1* | 9/2011 | Jorasch ............. G06F 17/30899 | |
| | | | 709/206 |
| 2012/0054135 A1* | 3/2012 | Salaka ................. G06Q 10/107 | |
| | | | 706/13 |
| 2012/0076367 A1* | 3/2012 | Tseng ............................ 382/118 | |
| 2012/0208568 A1 | 8/2012 | Cooley | |
| 2012/0254321 A1* | 10/2012 | Lindsay et al. ............... 709/206 | |
| 2012/0271729 A1* | 10/2012 | Vincelette .......... G06Q 30/0611 | |
| | | | 705/26.4 |
| 2013/0024522 A1* | 1/2013 | Pierre et al. .................. 709/206 | |
| 2013/0031183 A1 | 1/2013 | Kumar et al. | |
| 2013/0138428 A1* | 5/2013 | Chandramouli ...... G06F 17/274 | |
| | | | 704/9 |
| 2013/0218801 A1* | 8/2013 | Rago .................. G06F 17/2235 | |
| | | | 705/342 |
| 2014/0032306 A1* | 1/2014 | Sukornyk .............. G06Q 30/02 | |
| | | | 705/14.43 |
| 2014/0108675 A1 | 4/2014 | Wu | |
| 2014/0164352 A1* | 6/2014 | Denninghoff ...... H03H 9/02622 | |
| | | | 707/711 |
| 2014/0324902 A1 | 10/2014 | Morris et al. | |
| 2015/0256499 A1 | 9/2015 | Kumar et al. | |
| 2016/0110688 A1* | 4/2016 | Knox ................... G06Q 10/107 | |
| | | | 705/342 |
| 2017/0032408 A1 | 2/2017 | Kumar et al. | |
| 2017/0034101 A1 | 2/2017 | Kumar et al. | |

OTHER PUBLICATIONS

"Windows 7 Federated Search and SharePoint 2010" online article by Larry Cannell dated Jun. 2010.*

"Get email from Outlook to Sharepoint" online article by Cameron Dwyer dated Jan. 2012.*

"Craigslist Online Community." Craigslist.org. Jul. 6, 2010. <http://web.archive.org/web/20200706025939/http://www.craigslist.org/about/anonymize>.

Aguiar, Johnny B., Office Action dated Feb. 13, 2013 for U.S. Patent Application Publication No. US 2013-0031183.

Aguiar, Johnny B., Office Action dated Sep. 24, 2013 for U.S. Patent Application Publication No. US 2013-0031183.

Aguiar, Johnny B., Office Action dated Aug. 1, 2014 for U.S. Patent Application Publication No. US 2013-0031183.

Aguiar, Johnny B., Office Action dated Aug. 29, 2016 for U.S. Patent Application Publication No. US 2013-0031183.

Aguiar, Johnny B., Office Action dated Dec. 9, 2016 for U.S. Patent Application Publication No. US 2013-0031183.

Jean, Frantz B., Office Action dated Feb. 4, 2016 for U.S. Pat. No. 9,521,100.

U.S. Appl. No. 13/191,412, filed Jul. 26, 2011.

U.S. Appl. No. 14/049,204, filed Oct. 8, 2016, now U.S. Pat. No. 9,521,100.

U.S. Appl. No. 14/485,013, filed Sep. 12, 2014.

U.S. Appl. No. 15/169,707, filed May 31, 2016.

U.S. Appl. No. 15/202,461, filed Jul. 5, 2016.

* cited by examiner

AGGREGATE ELECTRONIC MAIL MESSAGE HANDLING

CROSS-REFERENCE TO RELATED APPLICATIONS

This application is a continuation-in-part of U.S. Nonprovisional patent application Ser. No. 13/191,412, filed on Jul. 26, 2011, which is herein incorporated by reference for all purposes.

FIELD

The present invention relates generally to computer software, computer program architecture, data and database management, social media, and web applications. More specifically, techniques for electronic mail processing and publication for shared environments are described.

BACKGROUND

Electronic messaging is an important function for sharing data with other individuals, organizations, or entities. Conventional electronic messaging solutions such as electronic mail (hereafter "email") applications, servers, and platforms allow users to forward, send, and receive emails. However, due to large amounts of information and data transferred using email, there are significant problems associated with conventional solutions that create substantial time and cost inefficiencies.

Some problems associated with conventional solutions do not facilitate searching of emails to locate specific messages or groups of related messages (i.e., "threads") by a particular topic, but instead rely upon general search or indexing facilities built into conventional electronic messaging solutions, which can be very time consuming for users. Inaccurate and difficult to use, general search or indexing facilities are typically keyword-based and fail to provide for chronologically-ordered and relevant groupings of emails. In a corporate or business context, finding timely specific emails is often important for uses such as auditing, but can be expensive and require specialized computer programs, software, or applications (hereafter "applications") in order to sift through large volumes of email data. For individuals, finding emails is also difficult, but for various types of users, sharing emails is typically reliant upon manual forwarding or sending operations. In other words, conventional solutions are limited in their ability to provide for collaborative tools to share emails, which often acts as a primary form of communication for individuals and organizations. Some conventional forms of social media allow for users to share data with each other, including manually posting emails and included content. However, these conventional solutions do not allow for the protection of user privacy nor provide for collaborative actions such as commenting or forwarding to yet other users.

Further, large quantities of emails and data stored or attached to these emails can lead to inefficient techniques for organizing electronic messaging data. As a conventional example, users are often reliant upon the use of internal file folders or structures that must be created manually into which emails (and attachments) can be classified. Further, once classified or stored, it is time consuming to retrieve an email or share it with other users who may find the data contained within a particular message to be useful or valuable, requiring a user to manually forward the email.

Thus, what is needed is a solution for electronic mail processing and publication for shared environments without the limitations of conventional techniques.

BRIEF DESCRIPTION OF THE DRAWINGS

Various embodiments or examples ("examples") are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. Design, publishing, and other types of applications such as Dreamweaver®, Shockwave®, Flash®, Drupal and Fireworks® may also be used to implement the described techniques. Database management systems (i.e., "DBMS"), search facilities and platforms, web crawlers (i.e., computer programs that automatically or semi-automatically visit, index, archive or copy content from, various websites (hereafter referred to as "crawlers")), and other features may be implemented using various types of proprietary or open source technologies, including MySQL, Oracle (from Oracle of Redwood Shores, Calif.), Solr and Nutch from The Apache Software Foundation of Forest Hill, Md., among others and without limitation. The described techniques may be varied and are not limited to the examples or descriptions provided.

Figure 1:
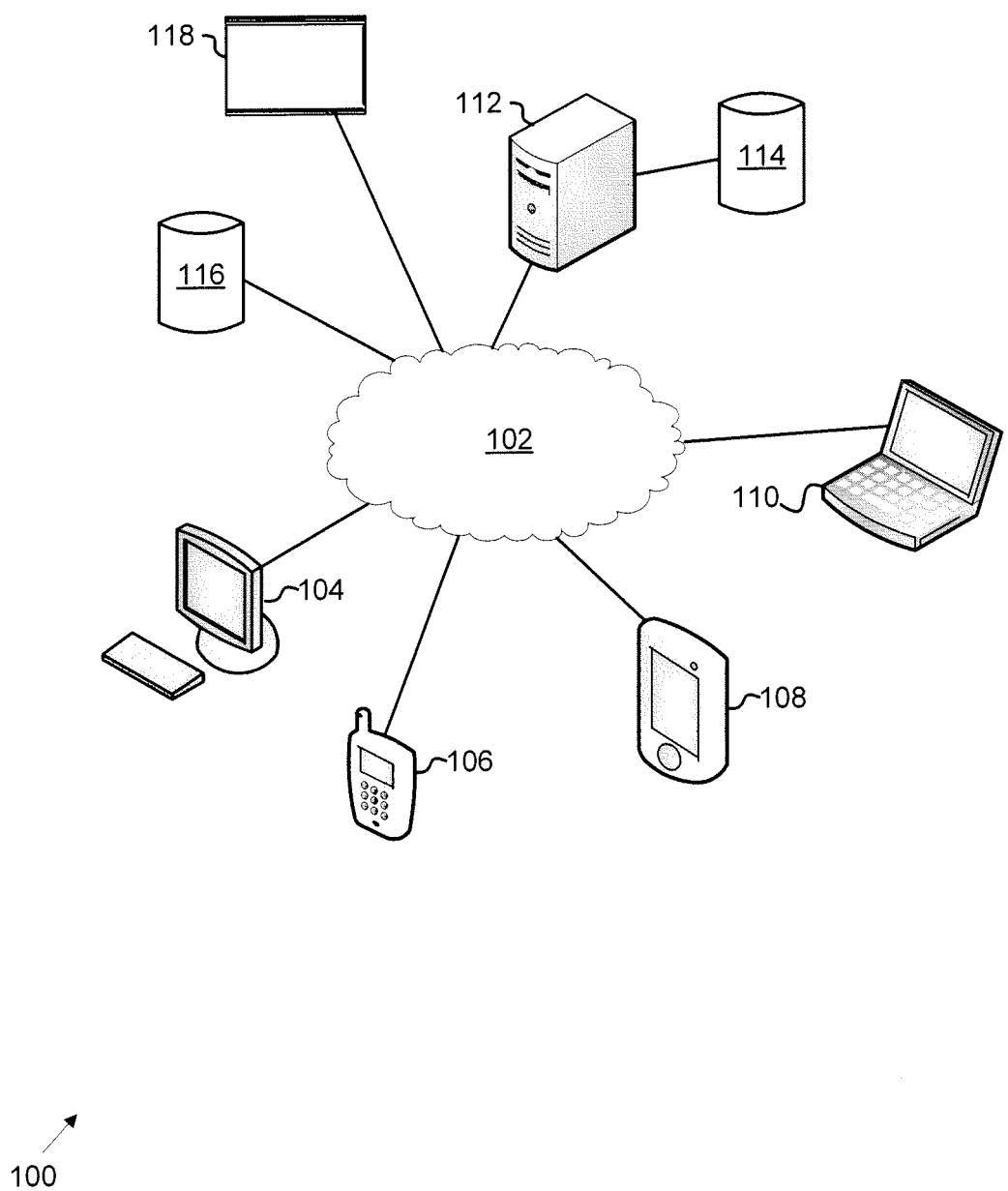
FIG. 1 illustrates an exemplary system for electronic mail processing and publication for shared environments.

FIG. 1 illustrates an exemplary system for electronic mail processing and publication for shared environments. Here, system 100 includes network 102, clients 104-110, server 112, databases 114-116, and website 118. "Elements" may refer to one or more of network 102, clients 104-110, server 112, databases 114-116, and website 118 shown in association with system 100. As shown, the type, quantity, configuration, topology, and other characteristics are provided for purposes of illustration only and may be varied beyond the examples shown and provided. In some examples, network 102 may be any type of data network including, without limitation, a local area network (LAN), wide area network (WAN), municipal area network (MAN), wireless local area network (WLAN), computing cloud, or any other type of aggregation of computing, networking, storage, or processing resources. As shown, clients 104-110 may be implemented as a desktop computer (e.g., client 104), mobile communication (i.e., voice and data) device (e.g., client 106), mobile computing device (e.g., client 108), or notebook or laptop (i.e., portable) computing device (client 110). Each of clients 104-110 may be in data communication with server 112 using network 102. In some examples, server 112 may be a web, application, email, or other type of server, without limitation.

Databases 114-116, in some examples, may be directly or indirectly in data communication with server 112, which may be implemented as described above to perform one or more applications, deliver services or resources to clients 104-110, execute or compile applications, or otherwise provide any type of processing capability or facility, without limitation. Data associated with the techniques described herein may be stored in one or both of databases 114-116. In other examples, data may also be stored in embedded memory, of any type, with server 112 or any of clients 104-110. Still further, data may be stored and retrieved by server 112 or any of clients 104-110 from any of databases 114-116 without limitation as to any given database schema or structure. For example, an email may be transmitted to a "shared destination," which may be an email server (e.g., server 112), email account, or other resource that is configured to accept email messages sent using messaging protocols such as Simple Mail Transfer Protocol (hereafter "SMTP") and received using other protocols such as Internet Message Access Protocol (hereafter "IMAP") or Post Office Protocol (hereafter "POP"), among others. In some examples, email receipt may be indicated automatically or semi-automatically to server 112. In other examples, received emails sent to an email account or client may be retrieved periodically based on a set or irregular schedule. For example, an application hosted and running on server 112 may be configured to retrieve emails for further processing, as described below, on a set schedule (e.g., every 1, 5, 30, 60 minutes, or the like). Using various types of email receipt protocols (e.g., IMAP, POP, or others), emails may be retrieved from an email account or shared destination. Once retrieved by server 112, emails may be stored in database 114 and/or 116 and processed further to generated processed messages for posting to a shared environment (e.g., website 118). As used herein, an email account to which emails are sent for posting in a shared environment may be referred to as a "shared destination."

A shared destination may be, in some examples, an email account hosted on server 112 that is configured to receive emails sent from various sources and intended for posting to a given website (e.g., website 118). Data associated with emails sent to a shared destination may be stored in database 114 or, in other examples, remotely stored in database 116.

As shown here, website 118 may be described as a "shared environment" or facility to which data, information, or other content may be posted or published. As used herein, "posting" or "publication" may be used interchangeably and are intended to refer to the format, transmission, upload, design, layout, and other parameters of content manipulated relative to a given environment (e.g., website 118, among others). In some examples, website 118 may be a website at which emails, attachments, data, information, or other types of content may be viewed, retrieved, posted, or deleted, without limitation. In other examples, system 100 and the above-described elements may be varied in function, structure, configuration, topology, quantity, type, or other aspects and are not limited to the examples shown.

Figure 2:
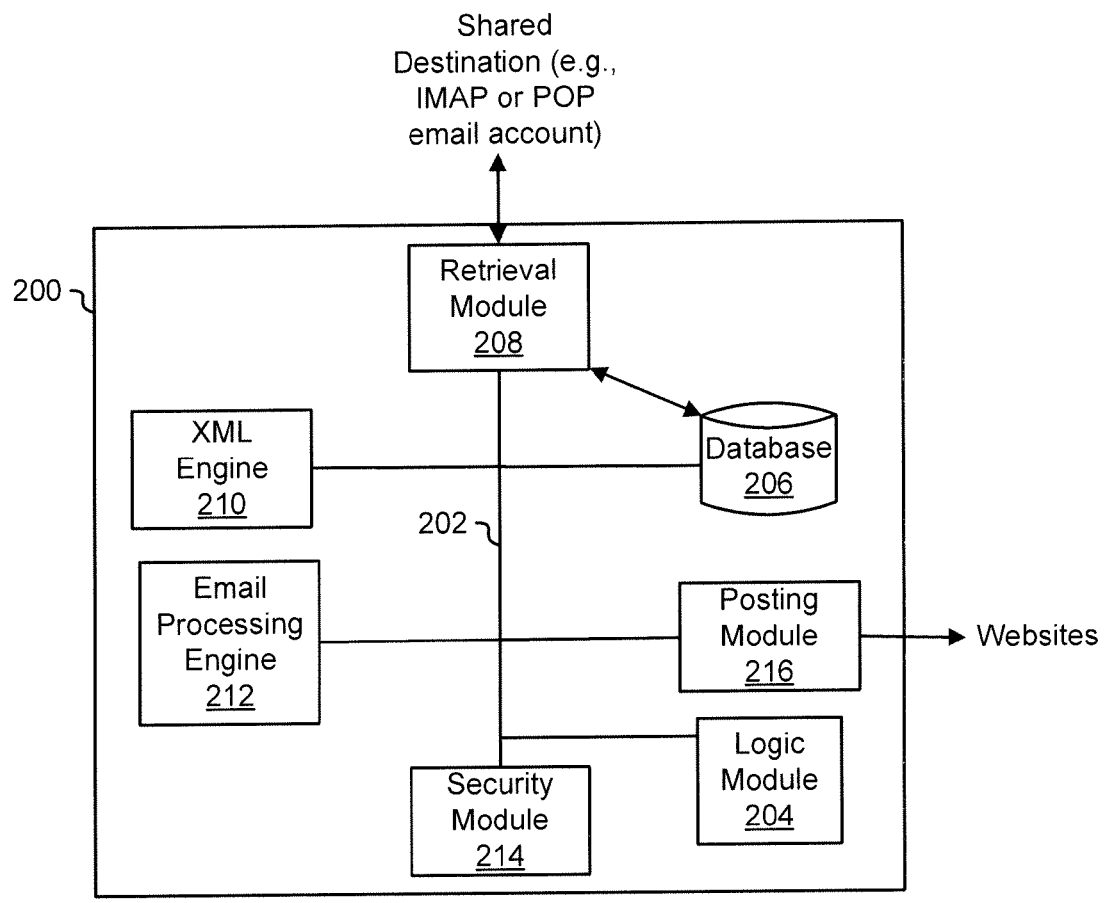
FIG. 2 an exemplary application architecture for electronic mail processing and publication for shared environments.

FIG. 2 an exemplary application architecture for electronic mail processing and publication for shared environments. Here, application 200 includes bus 202, logic module 204, database 206, retrieval module 208, XML engine 210, email processing engine 212, security module 214, and posting module 216. In some examples, bus 202 may be implemented as any type of data communication bus for transferring data between any of logic module 204, database 206, retrieval module 208, XML engine 210, email processing engine 212, security module 214, and posting module 216, without limitation to any given type, configuration, capacity, rating, or other characteristic. As shown, application 200 and the elements described herein (i.e., logic module 204, database 206, retrieval module 208, XML engine 210, email processing engine 212, security module 214, and posting module 216) may be implemented as hardware, software, firmware, circuitry, or a combination thereof and are not limited to any specific application structure or formatting, scripting, or programming language.

In some examples, logic module 204 may be configured to provide command and/or control signals, instructions, and functions to direct one or more of database 206, retrieval module 208, XML engine 210, email processing engine 212, security module 214, and posting module 216. Logic module 204, for example, may direct retrieval module 208 to identify, locate, and retrieve emails sent to a shared destination (e.g., IMAP or POP email account). Logic module 204 may also be configured to process retrieved emails to generate processed messages (i.e., retrieved emails that have been processed by email processing engine 212) for posting or publication in a shared environment (e.g., website 118 (FIG. 1)) prior to being directed to posting module 216 for posting to the shared environment (e.g., website 118). Further, logic module 204 may be configured to evaluate retrieved emails to determine whether a security threat (e.g., malicious software (hereafter "malware"), spyware (i.e., malware intended to passively gather data and information from a host operating system, computer, or application), cross site scripting, and others. Security module 214 may be implemented using various types of security software, firmware, or hardware, such as intrusion detection and prevention systems, antivirus, or others, without limitation, that are intended to detect whether an email to be processed by email processing engine 212 is a security threat that, once posted to a shared environment (e.g., website 118) may be accessible and pose a security risk to other clients.

As shown, data may be stored in database 206 using any type of database, database schema, or storage mechanism, without limitation, including storage area networks (hereafter "SAN"), network attached storage (hereafter "NAS"), cloud storage, or the like. Further, retrieved emails may be stored using various types of markup and formatting languages such as XML and others. XML engine 210 is an example of a type of facility or resource that may be used to evaluate, format, and generate XML-formatted data to be stored, for example, in database 206 or, as another example, to be processed for posting to a shared environment (e.g., website 118) by email processing engine 212 and posting module 216. In other examples, application 200 may be implemented in any type of application environment, distributed or otherwise, using one or more application servers, computers, or computing platforms from which to host. Apart from the examples shown and described, application 200 and the above-described elements may be varied in function, structure, format, language, configuration, or other aspects and are not limited to any specific implementation.

Figure 3:
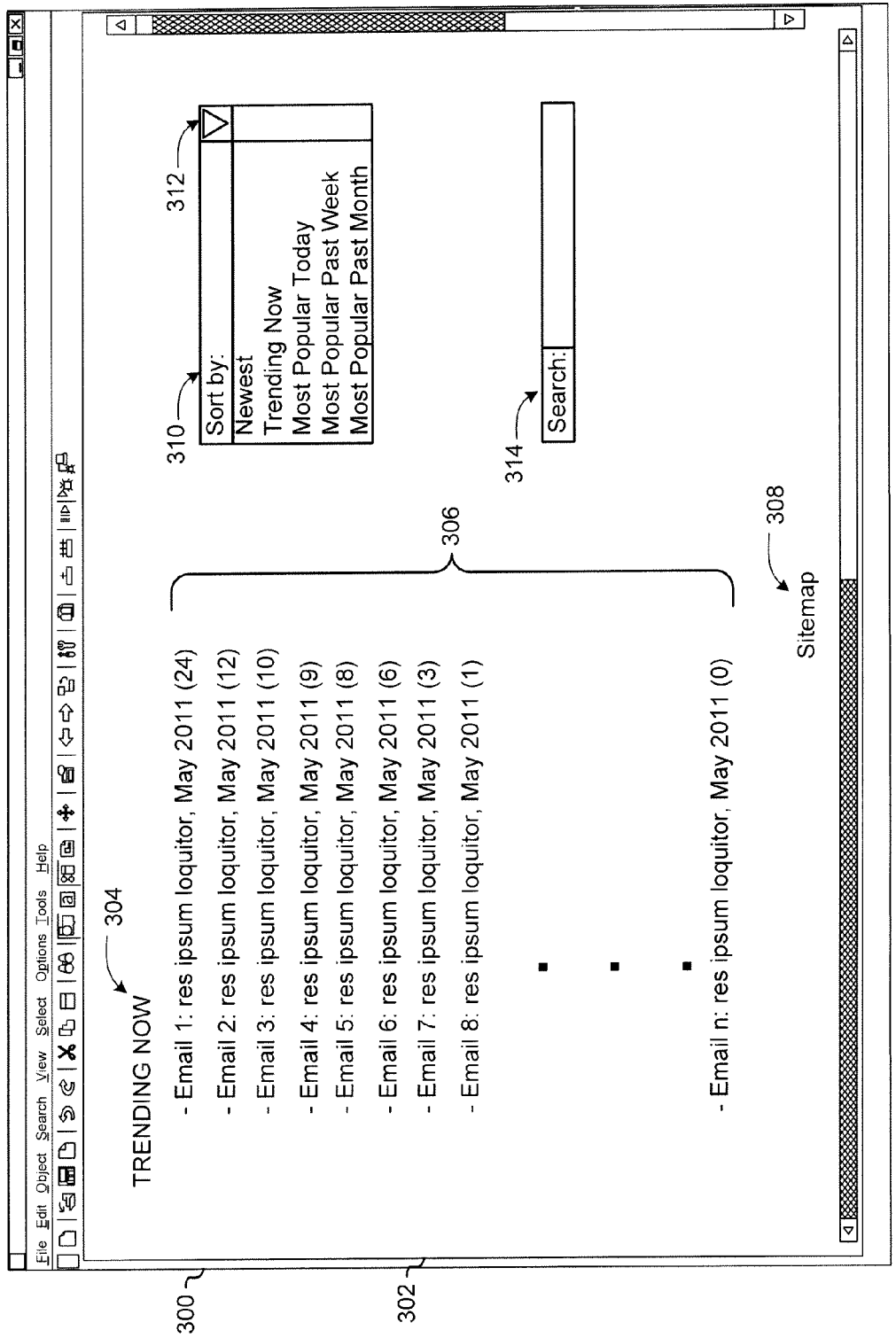
FIG. 3 illustrates an exemplary shared environment for publication of processed electronic mail messages.

FIG. 3 illustrates an exemplary shared environment for publication of processed electronic mail messages. Here, window 300 includes shared environment 302, title tag 304, process messages 306, sitemap link 308, sort window 310, pulldown menu 312, and search field 314. In some examples, window 300 may be representative of a graphical user interface display that is presented by website 118 (FIG. 1). As shown, shared environment 302 may be a graphical display environment in which processed messages may be displayed and reviewed. Based on title tag 304, emails may be listed and displayed based on, for example, popularity (e.g., the number of comments posted in response to a given email posting, most popular today, most popular in past week, most popular in past month, and the like), age (i.e., newest-to-oldest, oldest-to-newest, and the like), trends of immediate interest (i.e., emails that are of immediate interest to the overall user or viewer population), or other factors apart from those described. As used herein, title tag 304 may be a descriptive title or categorical reference associated with a given email and other emails that are contextually or thematically related. In some examples, title tag 304 may use a format such as "<subject line of email>|SocialMail" in order to aid in search engine optimization (hereafter "SEO").

By using the subject line of an email as part of a header tag (e.g., H1 tag), the content, data, or information contained may be used to enhance search engine optimization to allow other users to find and retrieve processed messages 306. By using modifying the header tags of retrieved emails, processed messages 306 can be improved for SEO, facilitating searches performed for various topics, themes, keywords, or emails.

In some examples, the quantity of processed messages may be set to a discrete number per page (e.g., 10 per page, 100, 1000, customizable, user-specified, system-specified, rules-based, and others). Further, when a user navigates to a given page using, for example, a web (i.e., the World Wide Web (hereafter "web")) browsing application processed messages 306 may be sorted based on criteria specified in sort window 310 by using pulldown menu 312. In this example, criteria such as "Newest," "Trending Now," "Most Popular Today," "Most Popular Past Week," and "Most Popular Past Month" may be chosen in order to sort processed messages 306. When selected, a criterion may cause processed shared environment 302 to be rendered such that the order is determined based on the selected criteria. In other examples, posted emails may be ranked using various techniques and, as an example, identified using the "Trending Now" feature. For example, posted emails may be ranked based on determining the number of users to which the posted email has been forwarded (e.g., if a posted email has been forwarded previously multiple times to an aggregate pool of 20 recipients, a quantitative rank may be assigned using various techniques, including assigning a weighted or unweighted ranking value based on the number of recipients (e.g., in the example above, 20)). In other examples, rankings may be performed differently using various techniques or algorithms, without limitation. As an indicator of activity within a service providing window 300, an "activity stream" or other type of feed or data stream may be created in which one or more posted emails, replies, comments, votes, rankings, or other activities occurring may be posted generally for users to view (in some contexts such as within corporate enterprises, this and other features may be suppressed in order to confine the applicability of the described techniques to prescribed enterprise purposes). In some examples, users may opt-in and subscribe to an activity stream in order to ensure that those users who do not elect to receive updates as to activity are not receiving unwanted notifications. In other examples, processed messages 306 may be sorted or displayed differently and are not limited to those shown and described.

Here, processed messages 306 may also be searched using a facility that has an interface such as search field 314 to permit the entry of keywords or other items that may be used to select the appearance of processed messages 306. A search of processed messages 306 may be used to find email content (i.e., content, data, information, media, rich media, text, or the like) from a given pool of emails posted to shared environment 302. When posted, emails may be made "anonymous" (i.e., remove identifying information such as email addresses) in order to protect user privacy, as described in greater detail below in connection with FIG. 5. In some examples, each of processed messages 306 may be treated like an individual post that, when selected, is hyperlinked to another page where related emails of the same topic may be listed, as described below in connection with FIGS. 4A-4B.

Referring back to FIG. 3, shared environment 302 can be provided as a destination website (e.g., website 118) that enables the entry or submission of email content for various types of purposes (e.g., interest, humor, amusement, fun, business, enterprise/corporate, collaborative work sharing, and others, without limitation). Email content may be submitted using shared environment 302 to permit other users to enter comments or submit other emails related to a given topic or original email (i.e., threading), as indicated by title topic 304. Each email submitted may be processed by email processing engine 212 (FIG. 2) to be generated into a processed message and posted as part of a thread.

In other examples, users can view emails associated with topics of various types of interests. Within a corporate organization or enterprise (including for-profit, non-profit, governmental organizations), emails may be submitted for collective sharing and collaborative input by other members of the same organization. Likewise, security module 214 (FIG. 2) may be configured to provide additional security to permit authenticated use by members of a given organization as opposed to enabling shared environment 302 to be publicly accessible. Generally, shared environment 302 may be used as a forum for the sharing of email content that does not require the manual formatting of email content for posting. In other words, a user having an account recorded in one or both of databases 114-116 may forward or send emails to a service hosted by server 112, which may be processed by email processing engine 212 (as described in greater detail below in connection with FIG. 5) and posted to shared environment 302. Once made available to a community (e.g., public, closed, non-public, corporate, enterprise, and the like) of users, other emails may be posted directly to shared environment 302.

Additionally, sitemap link 308 may be used to hyperlink (i.e., linking (i.e., pointing a web browsing application to another address and retrieving and displaying content from that location) to another page of website 118) to another page of website 118 to retrieve and view information associated with posts (i.e., publications) of processed messages to shared environment 302. In some examples, by interacting with sitemap link 308, another web page is rendered that displays a list of processed messages classified by the month and year (i.e., posting date). Each entry of the list of processed messages (not shown) may be hyperlinked to another page that, when invoked, displays another page listing subject lines of individual posted processed messages and an excerpt of the related email. In some examples, the subject lines may also be hyperlinked to the complete post, which is displayed when the links are invoked. In other examples, the above-described examples may be varied in function, structure, format, language, configuration, or other aspects and are not limited to any specific implementation.

Figure 4A:
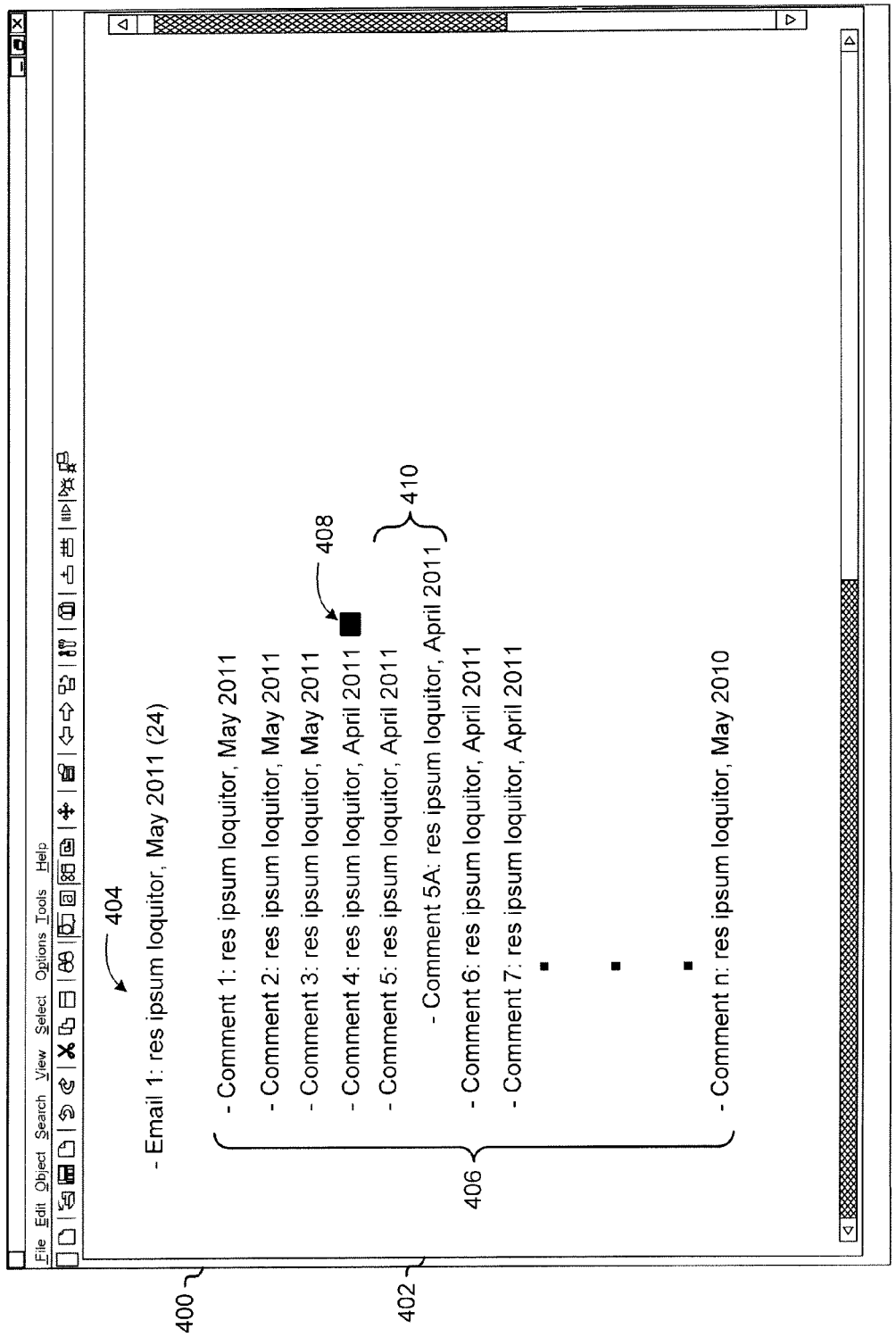
FIG. 4A illustrates a further exemplary shared environment for publication of processed electronic mail messages.

FIG. 4A illustrates a further exemplary shared environment for publication of processed electronic mail messages. Here, window 400 includes shared environment 402, title tag 404, processed messages 406, attachment icon 408, and threaded messages 410. As shown, if a hyperlink associated with one of processed messages 306 (FIG. 3) is invoked another web page may be rendered similarly to that presented in window 400. In some examples, a processed message and related processed messages may be presented in shared environment 402. A selected processed message may be indicated by title tag 404 and subsequent processed messages submitted in response or in relation to title tag 404 may be presented as a thread, as shown by processed messages 406. Further, one or more of processed messages 406 may have an attachment (i.e., an attached file, document, image, or other data or information), which may be indicated using, for example, attachment icon 408. In other examples, different types of icons, indicators, or indicia may be used to indicate visually or graphically whether an attachment is present. Further, attachment icon 408 may be hyperlinked to enable downloading, opening, viewing, or otherwise interacting with an attachment when a mouse pointer of other human computing interface (i.e., "HCI") or input or input-output device is used to select (i.e., invoke) attachment icon 408. Still further, other emails may be submitted for generation of additional processed messages as extended threads, as shown by threaded messages 410.

As shown, each of processed messages 406 may be hyperlinked and, when invoked, may initiate the instantiation and rendering of another window that displays data, information, or other content associated with the selected processed message. As described in greater detail below in connection with FIG. 5, a selected processed message may be configured to direct a web browsing application (not shown) to an address that is associated with another web page that presents content such as the original email of the processed message selected. Some data, information, or content may also be modified in the new window (not shown) in order to provide data security, prevent unauthorized access, or perform other functions that would be beneficial to a collaborative data sharing environment such as shared environment 402. In still other examples, window and shared environment 402 may be implemented differently in layout, design, function, structure, features, or other aspects and are not limited to those shown and provided.

Figure 4B:
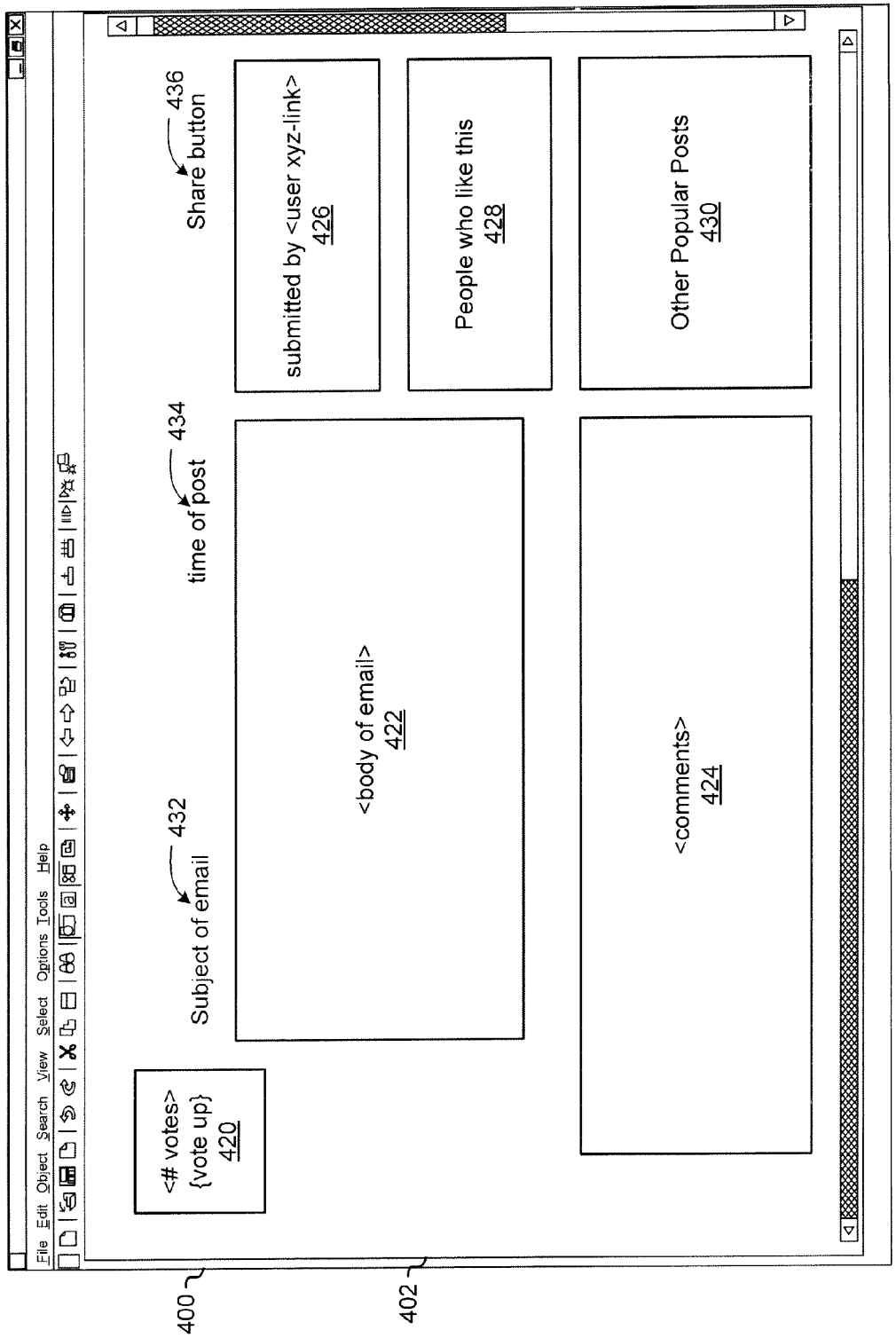
FIG. 4B illustrates an alternative exemplary shared environment for publication of processed electronic mail messages.

FIG. 4B illustrates an alternative exemplary shared environment for publication of processed electronic mail messages. Here, window 400 includes shared environment 402, sections 420-430, data 432-434, and button 436. In some examples, window 400 may be implemented as a graphical user interface such as that associated with a web browser or other web browsing application. As shown window 400 may be configured to present a page that displays several different functions or structures. For example, section 420 may be implemented to present the number of votes associated with a given email that is submitted and posted, as indicated by data 432 (e.g., "Subject of email," which may be identified from a processed email), data 434 (e.g., "time of post," which may also be posted from a processed email), section 422 (e.g., the body of the email, section 426 (e.g., identification of a posting user based on an "anonymized" email address or other user name (e.g., "user xyz," which may be hyperlinked to another page that provides one or more details associated with a given user. Alternatively, when an email is posted, a user may "claim" ownership of a given email by creating a user account, such as that described herein, associated with the sending email address of the posted email.

Further, any email that is posted in window 400 may also include information associated with the number of votes received by other users (e.g., section 420), comments from one or more other users, which may also include replies to comments from the posting email sender (e.g., section 424), people indicating their "like" (or in some examples, dislike (not shown)) of the posted email (e.g., section 428), or related information or data (e.g., other posts that may be related contextually, thematically, by sender, by topic, and others, without limitation) associated with the given posted email (e.g., section 430). In some examples, users may vote for various purposes, including expressing their like, dislike, favor, disfavor, or other action or expression associated with a given posted email. Still further, if a given reader (i.e., user) likes the posted email, she may elect to share the post with another user by using an interactive feature or function such as button 436 that may open another window (not shown), field (not shown), interface (not shown), or the like that permits entry of another user's identifying information (e.g., email address, user name, or the like) in order to share the posted content. As an example, third party applications such as Facebook, Inc. of Menlo Park, Calif., may be coupled to an application implementing the described techniques (including, but not limited to window 400) enabling users (e.g., user xyz) to share the posted content with other users using the third party application (e.g., Facebook, Twitter (as developed by Twitter, Inc. of San Francisco, Calif.), blogs, and other online applications, social media, media, or the like, without limitation). In some examples, users may not have an account with other social media business, websites, or the like. However, the described techniques enable users to post content (e.g., emails) and share them with other users through, for example, an application programming interface (API) to these other websites using posting module 216 (FIG. 2). Referring back to FIG. 4B, users may also have accounts with third party websites and features may be included to enable these users to share content using the described techniques. In other words, the described techniques may be implemented as a service apart from various types of content or social media or entertainment websites, but enable users to share, send, forward, reply to, retrieve, or perform other functions associated with posted emails without requiring the creation of user accounts. As another example, the techniques described herein may be used by individual or organizations such as corporate enterprises.

For example, a corporate enterprise may use the described techniques in order to provide a closed or private (e.g., corporate or in-enterprise) forum or enterprise for its employees to share email content in a collaborative manner. In some examples, corporate employees may post emails using their corporate email addresses. In other examples, corporate employees may post emails using assigned or self-identified user names that mask an individual email address in order to prevent unwanted responsive email or comments to the posted content. In still other examples, by posting emails using the described techniques, various individuals or stakeholders within a corporate organization may be placed on a notice of a given user's posted email without requiring the user to individually and specifically identify various addressees. The described techniques aid in eliminating time and labor-intensive email creation efforts that corporate users often must undergo in order to notify supervisors, managers, executives, co-workers, project team members, and the like.

As shown, various types of purposes may motivate the described techniques for use within a corporate enterprise. In some examples, when a user is included as an addressee on a posted email, she may elect to stop or continue receiving notification of the posted emails, comments, votes, and other actions associated with these. In other examples, posted email subject lines may be used to initiate a discussion forum associated with the given subject. For example, if a subject line states "Sales Contract," the subject line may render the posted email and associated content (e.g., FIG. 4B) available to a user when constructing an email, regardless of whether the user is the original author of the email. In other words, a user can use the described techniques to send an "inline" or in-thread reply or forward the email to another user who is separate and apart from the population having access to the posted email (in some examples, the user may be outside of the corporate enterprise or organization). In still other examples, window and shared environment 402 may be implemented differently in layout, design, function, structure, features, or other aspects and are not limited to those shown and provided.

Figure 5:
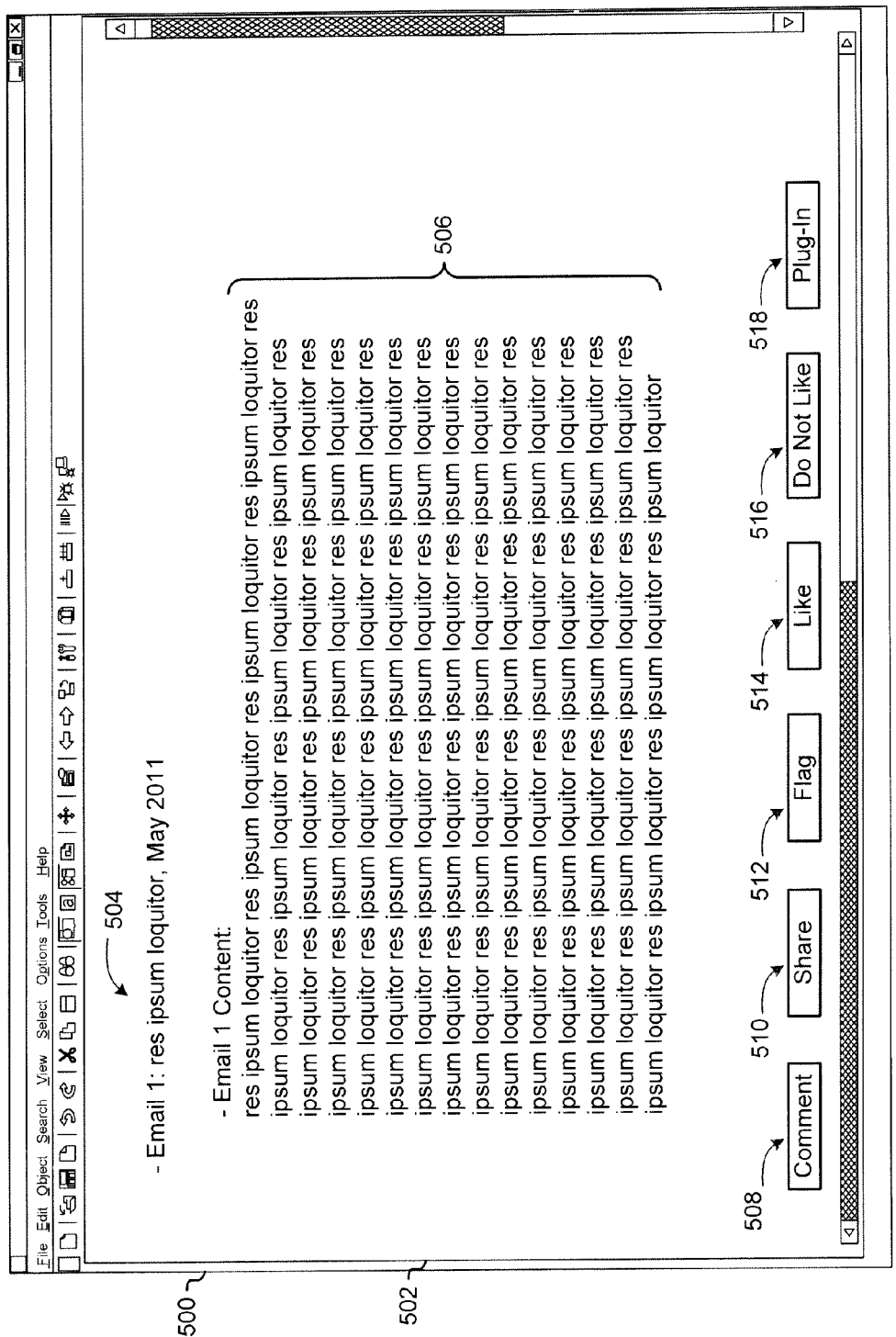
FIG. 5 illustrates another exemplary shared environment for publication of processed electronic mail messages.

FIG. 5 illustrates another exemplary shared environment for publication of processed electronic mail messages. Here, window 500 includes shared environment 502, title tag 504, processed message content 506, comment function 508, share function 510, flag function 512, like function 514, do not like function 516, and plug-in function 518. In some examples, the quantity, type, function, structure, or other aspects of window 500 and the elements shown may be varied and are not limited to those presented, which are provided for purposes of exemplary explanation. As shown, when one of processed messages 406 is selected, a web browsing application or other type of client interface may be opened in window 500, displaying processed message content 506 and indicating it is related to the selected processed message by title tag 504

Further, shared environment 502 may be designed and implemented to provide one or more functions that may be used in connection with processed message content 506. For example, a comment may be entered in association with processed message content 506 by interacting with comment function 508, which may be implemented as a button or link. When selected, comment function 508 may be configured to open a field, form, or altogether new web page in which a user may enter a subsequent comment using a variety of formats. Likewise, if selected, share function 510 may be used to share processed message content 506 with another user by, for example, emailing or using text-based messages via simple messaging service (i.e., "SMS") or another format or protocol. Further, processed message content 506 may also be "flagged" or indicated as being inappropriate, undesirable, copied, or otherwise by invoking flag function 512. Other functions that may be invoked include like function 514 and do not like function 516.

In some examples, if a user "likes" or wishes to publicly indicate her favor for processed message content 506, she may place a tag or mark to indicate such by invoking like function 514. Likewise, she may also invoke do not like function 516 to indicate that processed message content 506 is undesirable to her. By invoking popularity-related functions such as these, ranking of published message content 506 may be performed. As yet another function, plug-in function 518 may be invoked to connect, couple, distribute, publish, send, re-send, or perform other functions associated with a third-party website or service. For example, social media websites that permit user posting of data may provide an application programming interface ("API") that may be used to feed content in a given format for posting or publication. By invoking plug-in function 518, processed message content 506 may be posted to other shared environments such as Facebook (as developed by Facebook, Inc. of Palo Alto, Calif.), LinkedIn (as developed by LinkedIn, Inc. of Mountain View, Calif.), and many other social media-related services, sites, and destinations. In other examples, window 500 and the above-described elements may be implemented differently in layout, design, function, structure, features, or other aspects and are not limited to those shown and provided.

Figure 6A:
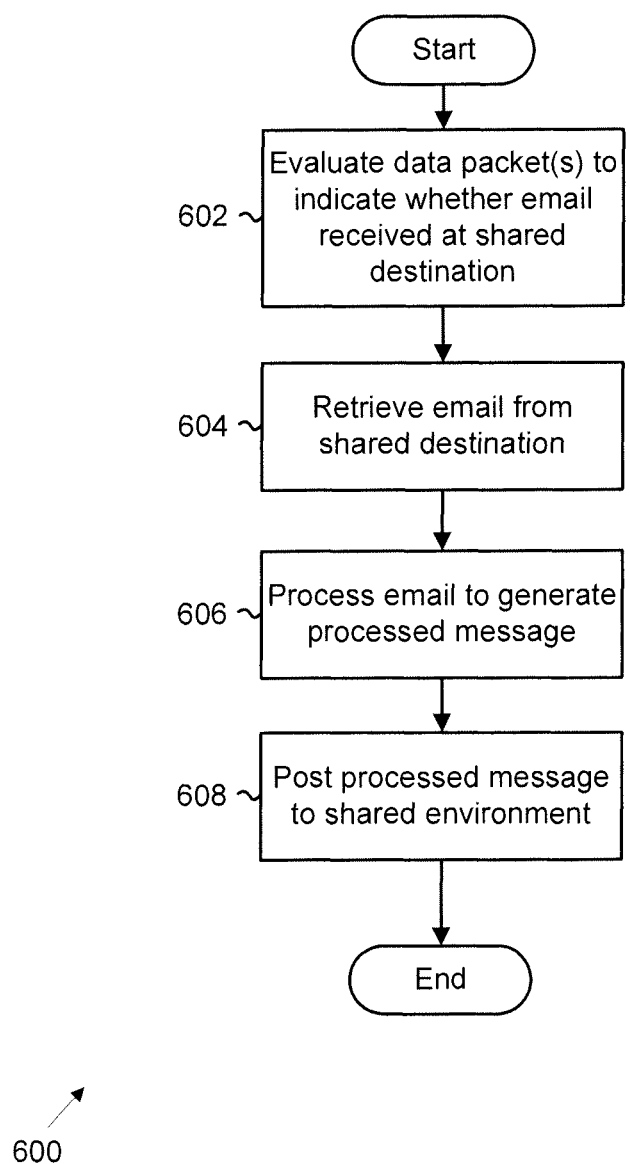
FIG. 6A illustrates an exemplary process for electronic mail processing and publication for shared environments.

FIG. 6A illustrates an exemplary process for electronic mail processing and publication for shared environments. Here, process 600 starts by evaluating one or more data packets associated with an email that is received at a shared destination such as an email account or server (602). Upon detecting, based upon the evaluation of data packets to determine whether mail has been received (using either an IMAP or POP-based protocol), the received email is retrieved (604). Once retrieved, the email is processed to generate a processed message, such as that described above in connection with FIGS. 3-5 (606). Once processed, a processed message is posted to a shared environment such as website 118 (FIG. 1) (608).

As shown, data may be analyzed using various techniques. For example, data packets may be evaluated by analyzing a given domain associated with the sending email address. A corporate enterprise, as an example, may have a given domain (e.g., company.com) that is evaluated in order to provide message visibility to other users having the same domain. This may be implemented in order to provide a service to users and/or accounts within the given domain in order to prevent access to information or data. In other examples, the above-described process may be varied in the implementation, order, function, or structure of each or all steps and is not limited to those provided.

Figure 6B:
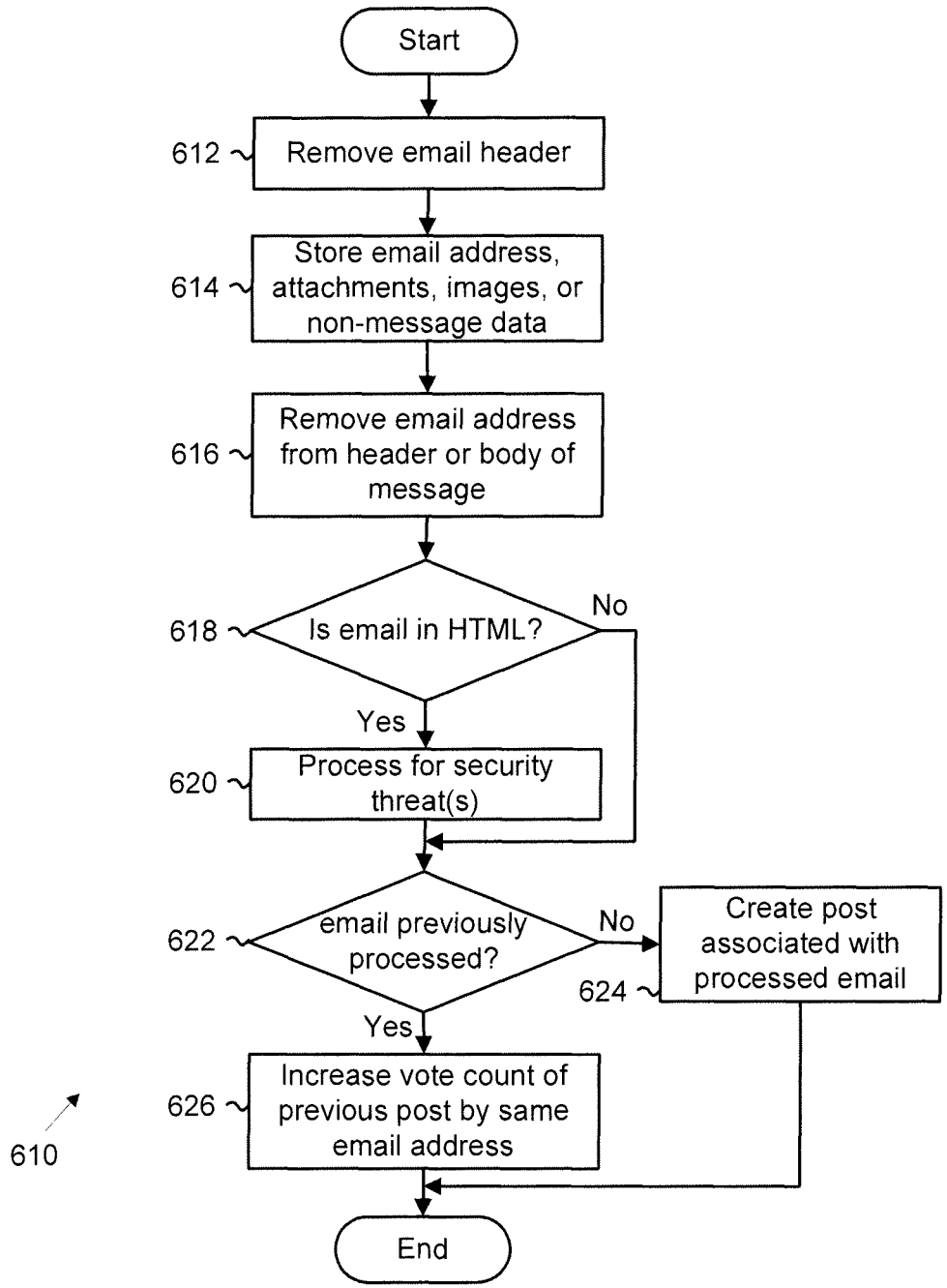
FIG. 6B illustrates an alternative exemplary process for electronic mail processing and publication for shared environments.

FIG. 6B illustrates an alternative exemplary process for electronic mail processing and publication for shared environments. Here, process 610 begins by processing an email submitted using the described techniques by removing email headers, which may include one or more email addresses (e.g., sender, destination, intermediate (i.e., email addresses found within a thread of emails such as a forward or chain of multiple replies, and the like) (612). For privacy, security, and other similar reasons, source-identifying information such as email addresses may be removed. In some examples, a received email may be processed for privacy reasons by parsing data associated with the posted email. The email address may be stored along with any non-message data, which may include attachments or embedded images of any kind or format (614). Non-message data, in some examples, may also be identified as any type of information or data that is not related to the message body. In other examples, non-message data may be any data that is not found within the payload of a message body. In still other examples, data to be stored in a database (e.g., database 206 (FIG. 2)) may be determined differently. The email address is then processed to identify any email addresses within the header or the body, which may be stored as fields or records associated with the sending email address in a database (616). A determination is made as to whether the email being processed is in HTML (i.e., Hyper Text Markup Language) or an HTML-based format (618). If the email being processed is in HTML or an HTML-based format (e.g., XHTML, DHTML, XML, and others, without limitation), then the email is processed for security threats (e.g., virus, malware, spyware, cross-site scripting, and others, without limitation) (620). If the email is not in HTML or an HTML-related format, then process 610 does not perform a security check.

In some examples, a check may be performed to determine whether the email being processed was previously processed (622). If the email was not previously processed, a new post with the email should be created (624). If the email was previously processed, in some examples, a vote count associated with the email may be incremented or increased. In other examples, the above-described process may be performed or implemented differently in steps, order, function, or other aspects, without limitation to those provided.

Figure 7:
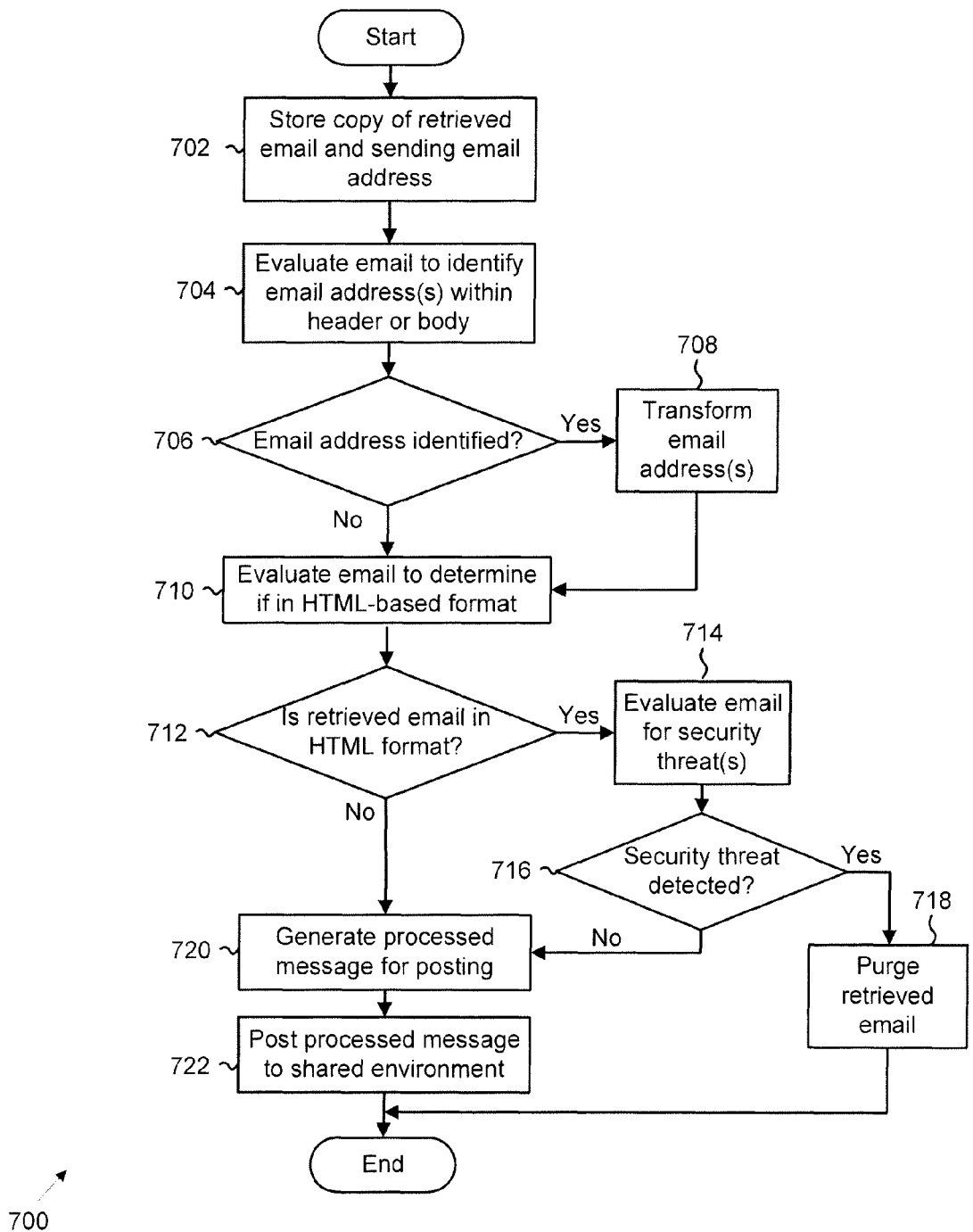
FIG. 7 illustrates a further exemplary process for electronic mail processing and publication for shared environments.

FIG. 7 illustrates a further exemplary process for electronic mail processing and publication for shared environments. As an exemplary illustration of generating processed messages, process 700 may be implemented. Here, process 700 starts by storing a copy of a retrieved email and recording the email address of the sending account or client (702). After storing in database 114 and/or 116 (FIG. 1) a copy of the retrieved email and email address of the sending account or client, the retrieved email is evaluated to identify whether there are email addresses within the header or body (i.e., payload) data of the email (704). A determination is made as to whether any email addresses are identified (706). If an email address is identified in either the header or body of the retrieved email, then the identified email addresses are transformed, which is described in greater detail below in connection with FIG. 8 (708).

Referring back to FIG. 7, if no email address is identified, then the retrieved email is further processed by evaluating the format of the email to determine whether it is in an HTML-based format (710). A determination is made as to whether the retrieved email is in an HTML-based format (712). If the email is in an HTML-based format, then it is further evaluated for security threats such as cross site scripting and others as described above (714). A determination is made as to whether a security threat is present (716). If a security threat is identified, then the retrieved email is purged and not stored in database 114 and/or 116 (718). In other examples, an alert message or other warning may be sent to the user of system 100 (FIG. 1) to indicate that a security threat was found. If no security threat is found, then a processed message is generated using the transformed email addresses (720). After generating a processed message, it may be posted to a shared environment (e.g., website 118 or shared environments 302 (FIG. 3), 402 (FIG. 4), or 502 (FIG. 5)) (722). In other examples, the above-described process may be varied in the implementation, order, function, or structure of each or all steps and is not limited to those provided.

Figure 8:
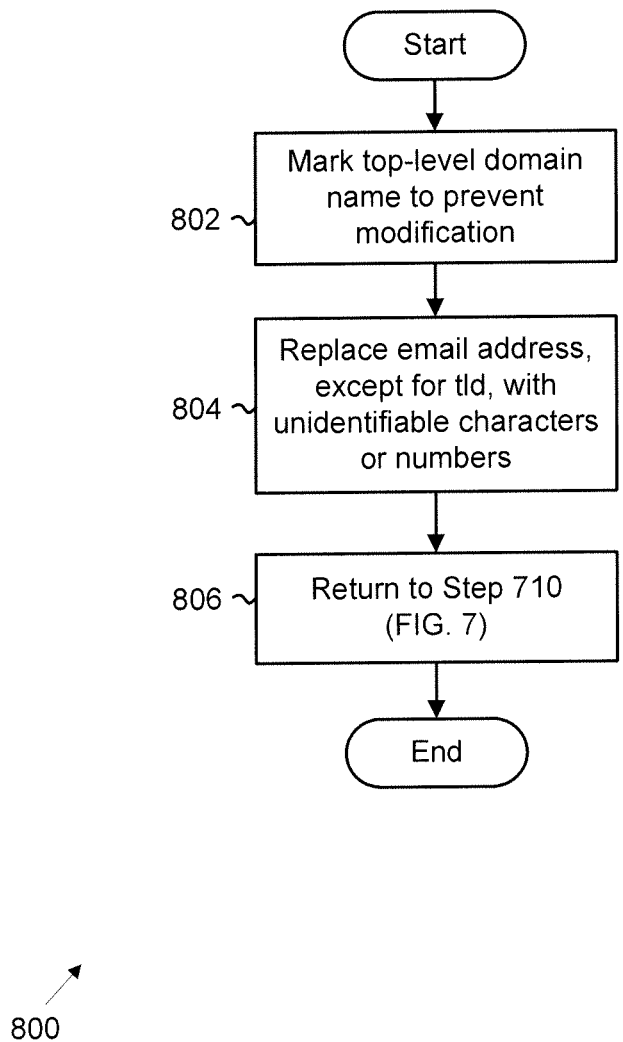
FIG. 8 illustrates an exemplary process for transforming email addresses for electronic mail processing and publication for shared environments.

FIG. 8 illustrates an exemplary process for transforming email addresses for electronic mail processing and publication for shared environments. Here, process 800 beings by marking or otherwise indicating a top-level domain (hereafter "TLD") associated with the email in order to prevent modification (i.e., transformation) as described herein (802). After marking or indicating the TLD associated with the email, all other characters associated with the domain name are replaced with unidentifiable characters or numbers (804).

For example, an email address "joe@smith.com" may be transformed by marking the ".com" for non-modification and replacing "joe@smith" with unidentifiable characters such as "xxx@xxxxx." Thus, the email address in the example above may be transformed from "joe@smith.com" to "xxx@xxxxx.com." After transforming identified email addresses in the header or body (i.e., payload data) of a retrieved email message, the process then returns to step 710 (FIG. 7) to continue processing for generating a processed message (806). In other examples, the above-described process may be varied in the implementation, order, function, or structure of each or all steps and is not limited to those provided.

Figure 9:
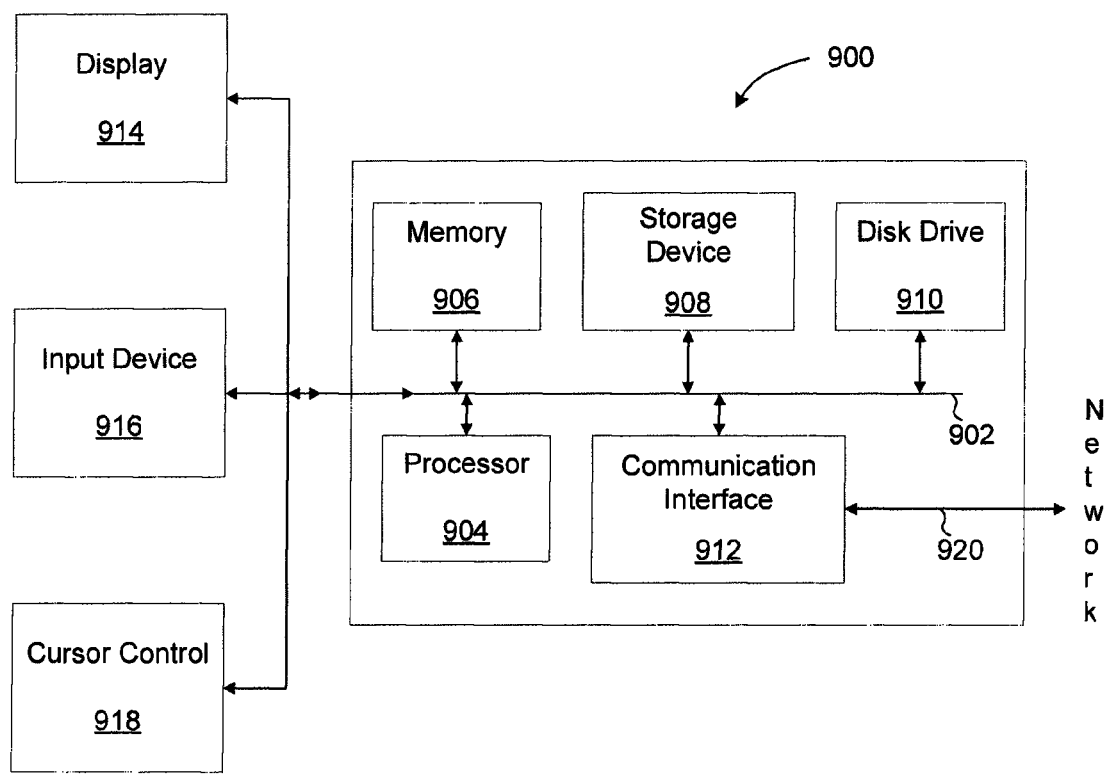
FIG. 9 illustrates an exemplary computer system suitable for electronic mail processing and publication for shared environments.

FIG. 9 illustrates an exemplary computer system suitable for electronic mail processing and publication for shared environments. In some examples, computer system 900 may be used to implement computer programs, applications, methods, processes, or other software to perform the above-described techniques. Computer system 900 includes a bus 902 or other communication mechanism for communicating information, which interconnects subsystems and devices, such as processor 904, system memory 906 (e.g., RAM), storage device 908 (e.g., ROM), disk drive 910 (e.g., magnetic or optical), communication interface 912 (e.g., modem or Ethernet card), display 914 (e.g., CRT or LCD), input device 916 (e.g., keyboard), and cursor control 918 (e.g., mouse or trackball).

According to some examples, computer system 900 performs specific operations by processor 904 executing one or more sequences of one or more instructions stored in system memory 906. Such instructions may be read into system memory 906 from another computer readable medium, such as static storage device 908 or disk drive 910. In some examples, hard-wired circuitry may be used in place of or in combination with software instructions for implementation.

The term "computer readable medium" refers to any tangible medium that participates in providing instructions to processor 904 for execution. Such a medium may take many forms, including but not limited to, non-volatile media and volatile media. Non-volatile media includes, for example, optical or magnetic disks, such as disk drive 910. Volatile media includes dynamic memory, such as system memory 906.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 902 for transmitting a computer data signal.

In some examples, execution of the sequences of instructions may be performed by a single computer system 900. According to some examples, two or more computer systems 900 coupled by communication link 920 (e.g., LAN, PSTN, or wireless network) may perform the sequence of instructions in coordination with one another. Computer system 900 may transmit and receive messages, data, and instructions, including program, i.e., application code, through communication link 920 and communication interface 912. Received program code may be executed by processor 904 as it is received, and/or stored in disk drive 910, or other non-volatile storage for later execution.

Figure 10:
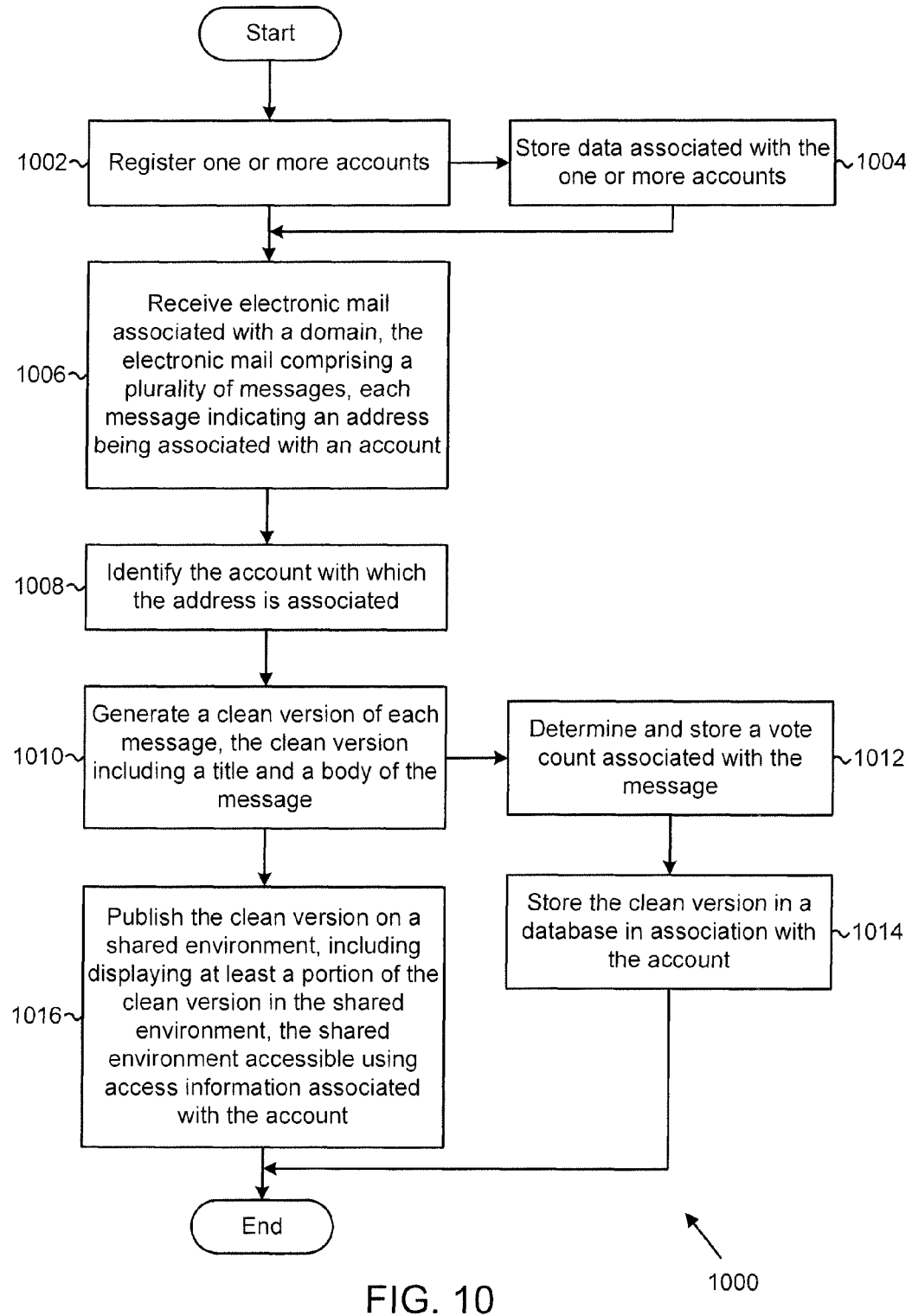
FIG. 10 illustrates an exemplary process for aggregating and cleaning electronic mail for publication on shared environments.

FIG. 10 illustrates an exemplary process for aggregating and cleaning electronic mail for publication on shared environments. Here, process 1000 begins with registering one or more accounts (1002). As used herein, an account may be an email account providing an address (i.e., email address) to which email messages (i.e., "messages" or "email") may be sent. For example, the account may be a shared destination, as described herein. In some examples, an account may be associated with a system for electronic mail processing and publication, as described herein. In some examples, an account may be registered for an address to which certain types or categories of email may be sent. For example, a user may register for an account devoted to receiving social emails, email newsletters, marketing or promotional emails, other subscription or opt-in emails, or other types of emails. In some examples, an account may be associated with a user through access information provided by the user during registration of the account. The access information may include one or more of a username, password, pin number, identification image or graphic, passcode, customer number, security questions, and other manners of identification. In some examples, the access information may include a user's access information (e.g., email account information, username, password, or the like) for accessing a previously registered social network account (e.g., an account with Facebook, Twitter, Google+, or other social network service). Data associated with the one or more accounts (e.g., access information, email address, and other information associated with the accounts) may be stored (e.g., in a database, repository, hard disk, or other storage) (1004). In other examples, an account may be registered using new access information created particularly for an electronic mail processing and publication account (i.e., not shared with a social network account). In still other examples, an electronic mail and publication account may be created using an option provided in connection with a sign-up email or webpage for subscription or opt-in email (e.g., newsletters, marketing or promotional emails, or the like). For example, an email or webpage used for signing up for, or opting into, a newsletter or marketing email, may provide a user with an option to create and use an electronic mail and publication account to view and manage those opt-in emails. In some examples, such an option may be provided as a link to an account setup page configured to create an electronic mail and publication account. In yet other examples, an electronic mail processing and publication account may be created through a link from an email sent to a different email account. For example, a content provider (i.e., merchant, marketing firm, or the like), as described below, may provide an option in an unsubscribe (i.e., opt-out or email preferences) window, email or webpage to set up an account with an electronic mail processing and publication account for managing subscription emails (e.g., newsletters, marketing or promotional emails, or other opt-in emails). Using this option, a user may register, or set up, an account with an electronic mail processing and publication account for better management of subscription or opt-in emails, as described herein. Providing this option may decrease the number of users that unsubscribe from receiving content from a content provider. In still other examples, an account may be registered differently and are not limited to those shown and described.

Once the account is registered, electronic mail associated with a domain may be received, the electronic mail comprising a plurality of messages, each message indicating an address being associated with an account (1006). In some examples, the domain may be a single domain, or a set of domains, associated with a system for electronic mail processing and publication. In some examples, a domain may be associated with a plurality of accounts, each account having an address associated with the domain. For example, multiple addresses may have the same domain (i.e., "@socialmail.com"), and a plurality of email messages addressed to one or more addresses associated with a domain, or a set of related domains, may be received by a system for electronic mail processing and publication. In some examples, the electronic mail associated with a domain, or set of domains, may be received, or aggregated, into a "catch all" or general mailbox configured to receive mail sent to multiple email addresses (e.g., a set of email addresses provided by an electronic mail processing system or service, a set of email addresses associated with the same domain, or the like). As used herein, "catch all mailbox" refers to a general mailbox configured to receive and aggregate email from a group, set, or other multiple of, email addresses (e.g., a group of related email addresses, a group of email addresses that share a domain, email addresses associated with a group of related domains, email addresses for a company or other entity, or other groups of email addresses). For example, a catch all mailbox may be configured to receive email sent to all or substantially all email addresses having the same domain, and a Javascript program may be employed to process the contents of the catch all mailbox (i.e., to parse the emails as described below). In other examples, email messages associated with each address may be received into an individual mailbox for the address. In still other examples, different types and numbers of mailboxes may be implemented for receiving email.

In some examples, email messages may be received directly from a content provider (e.g., Responsys®, Constant Contact®, Vertical Response®, or the like) through, for example, an API. As used herein, a content provider may be a merchant, an organization, a collective, a firm, or any other type of entity, engaged in providing information (e.g., advertisements, newsletters, updates, or other marketing materials) to subscribers, or other groups of opt-in recipients, using email. In some examples, an API may be configured to receive messages from content providers and deliver those messages to a user by way of a suitable environment (e.g., shared environment 1102 in FIG. 11, which may avoid incorrectly, improperly, or unnecessarily flagging or filtering a message). In some examples, an API implemented by an application for email processing and publication on shared environments (e.g., application 200 in FIG. 2) may be configured to receive or obtain email, or email content, from a content provider for subscribers having an account associated with the application without using third party email networks or servers, and to bypass one or more filters (i.e., spam filters) implemented by third party email networks or providers. In some examples, such an API may be configured to process data associated with dynamic content (e.g., video, audio, animation, links, interactive content, or the like) for presentation on a shared environment in an intended format, such that a user may view video or animation content, listen to audio, or the like, in a shared environment. For example, such an API may be configured to receive and process data associated with a video to generate output associated with presentation of the video on a tile in a shared environment. In another example, such an API may be configured to receive and process data associated with an image to generate output associated with presentation of the image on a tile in a shared environment. In some examples, some (i.e., multiple) or all messages in a shared environment (e.g., shared environment 1102 in FIG. 11, or the like) may be presented in an "open" format, where some or all contents (i.e., core, essential or cleaned contents (e.g., subject, title, or body of a message, or the like) of a message, including graphics, images, video and other content, may be readily viewed without clicking on a link, list, item, or other feature associated with each message, on a page. In other examples, email may be received through SMTP or other protocols, as described herein.

In some examples, an account may be configured to store (i.e., in database 206 in FIG. 2) and manage a user's email subscriptions. In some examples, the account associated with an application for email processing and publication on a shared environment (e.g., application 200 in FIG. 2) may be configured to retrieve or receive (i.e., using an API, as described herein) subscription emails directly and/or securely from content providers to which the account is subscribed, and to filter and not publish to a shared environment emails from content providers to which the account does not subscribe. For example, emails received for an address may be checked against a stored list of subscriptions for an account associated with the address before publication on a shared environment. In an example, if an email message is received from a content provider to which the account associated with a recipient address is not subscribed, the email message may not be published. In another example, if an email message is received from a content provider to which the account associated with a recipient address is subscribed, the email message will be given a high priority position in a shared environment (e.g., shared environment 1102 in FIG. 11), and if the email message is received from a content provider to which the account is not subscribed, given a low priority position in a shared environment (e.g., shared environment 1102 in FIG. 11).

Once the electronic mail is received, the account with which the address for each message may be identified (1008). In some examples, this may include reading the "To" line, or other recipient information, from a header section to determine the address to which the message is being sent, and matching the address to an account, for example, using a lookup or otherwise searching a database for an account associated with the address (i.e., using Javascript). In other examples, an account with which an address for a message may be identified differently and are not limited to those shown and described.

Once an account is identified, a clean version of each of the messages may be generated, the clean version including a title and a body of the message (1010). As used herein, a "clean version" of a message is one in which a parsing algorithm has cleaned, or removed (i.e., extracted and separately stored), personally identifiable information in the message. As used herein, "personally identifiable information" refers to information that may be used to uniquely identify, contact, or locate a user (e.g., a name, an e-mail address, a phone number, a social security number, driver's license number, other identification number, a biometric signature, or other form of identification). In other examples, sensitive information other than personally identifiable information also may be cleaned from a message. In some examples, personally identifiable or other sensitive information may be identified and cleaned from a message header (e.g., sender, recipient, route, or other header data). In other examples, personally identifiable or other sensitive information may be identified and cleaned from other portions of the message (e.g., body, other content, metadata, or the like). In still other examples, a clean version of a message may be generated differently and is not limited to those shown and described.

In some examples, a vote count associated with the message may be determined and stored (1012). For example, a comparison against previously received email messages may be conducted to determine, or update or increment, a vote count based upon the number of times an identical or substantially identical email message has been sent to other users (i.e., other accounts). In another example, a vote count for a message may be determined, or updated or incremented, based upon a number of times the message has been forwarded from one user to another user. In still another example, a vote count for a message may be determined, or updated or incremented, based upon a number of times the message has been posted, recommended, liked, shared or otherwise acted upon by a user to indicate a preference, or positive impression of, the message (e.g., by clicking a hyperlink to recommend, share or like a message on Facebook, by clicking a hyperlink to share a message on Twitter, by clicking a hyperlink to recommend (i.e., plus one) on Google+, or the like). In some examples, such vote counts may be determined using comparisons of a clean version of a message with data previously stored and associated with identical or substantially identical messages. In some examples, a vote count may be displayed on a shared environment (e.g., shared environment 1102 in FIG. 11), for example, in a tile for a corresponding message. In other examples, a vote count for a message may be determined, updated or incremented, differently and are not limited to those shown and described.

Figure 11:
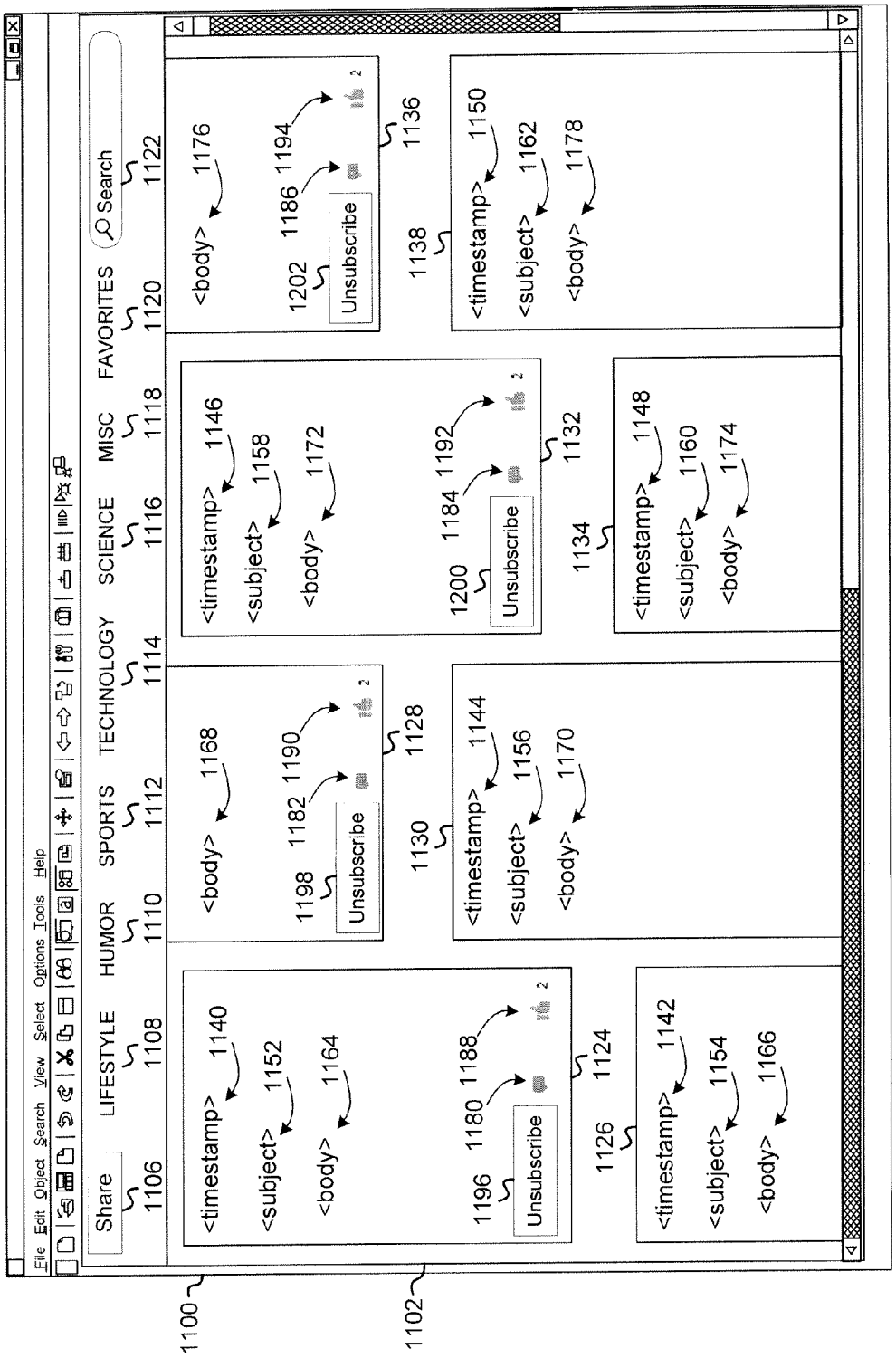
FIG. 11 illustrates an exemplary shared environment for publication of aggregated and cleaned electronic mail messages.

In some examples, the clean version may be stored in a database, or other storage as described herein, in association with the account to which it was sent (1014). In some examples, a clean version also may be published in a shared environment (i.e., shared environment 1102 in FIG. 11, or the like), including displaying at least a portion of the clean version in the shared environment, the shared environment accessible using access information associated with the account (1016). A shared environment may be a website (e.g., website 118 or the like), or other facility, to which data, information, or other content may be posted or published, as described herein. In some examples, the access information may be the access information used in registering the account. In some examples, publication of a clean version may include publishing data from the clean version on a tile on a shared environment (i.e., FIG. 11). For example, a tile on a shared environment might include, or show, a timestamp (i.e., indicating a day, date and/or time that the message was sent), an age (i.e., indicating how long ago the message was sent), a subject (i.e., the subject line of the message), a body (i.e., some or all of a body of the message), a graphic (i.e., some or all of the graphics from the message), an unsubscribe button, other buttons for executing an action associated with the message (e.g., comment, like, share, or otherwise provide feedback), or other aspects of the message. Displaying one or more messages in a prioritized (e.g., left to right, top to bottom, and the like, according to one or more criteria) and tiled format, or other web browsing interface, on a shared environment may promote readability (i.e., messages may be easier to see, read, review, skim, or otherwise be visually consumed by a user), as described below (FIG. 11). In some examples, a shared environment may include other items (e.g., hyperlinks, buttons, icons, widgets, or the like) for sorting, prioritizing, sharing, searching, or performing other acts associated with a published clean version of a message (see, e.g., FIG. 11). In some examples, a message may be tagged (i.e., in a database) as published after a clean version of the message is posted on a shared environment, such that a shared environment may be updated with new messages without re-publishing previously published messages. In other examples, the above-described process may be performed or implemented differently in steps, order, function, or other aspects, without limitation to those shown and described.

FIG. 11 illustrates an exemplary shared environment for publication of aggregated and cleaned electronic mail messages. Here, window 1100 includes shared environment 1102, share button 1106, filters 1108-1120, search field 1122, tiles 1124-1138, timestamps 1140-1150, subjects 1152-1162, message bodies 1164-1178, comment icons 1180-1186, vote icons 1188-1194, and unsubscribe buttons 1196-1202. In some examples, shared environment 1102 may be a website (e.g., website 118 or the like), including various pages associated with an account in a system for electronic mail processing and publication. In some examples, shared environment 1102 may be provide or display email data for, or associated be associated with, an account. In some examples, each account may be associated with, and accessed using, a website having a uniform resource locator (URL). For example, account information and emails received using an account associated with a domain name and a username may be accessed using a website having an URL in the format of "http://<domain name>/<username>." For example, an account for Joe Smith may be associated with a website at "http://socialmail.com/JoeSmith." In this example, Joe Smith's account may be configured to receive, process, and publish at "http://socialmail.com/JoeSmith," email messages sent to the address JoeSmith@socialmail.com. In some examples, access to a website may be secured using a password, passcode, security question, or the like. In other examples, a shared environment may be provided and accessed differently and is not limited to those shown and described.

As shown, shared environment 1102 may display, show, or otherwise publish, cleaned versions of email messages in an open tiled format, where the contents of a cleaned version of a message is displayed in a tile, for example, including image, video, or other content. For example, each of tiles 1124-1138 may represent (i.e., show, display, be associated with, or the like) a cleaned version of a message. Each tile may display a timestamp or age of a message (e.g., timestamp 1140-1150), a subject of a message (e.g., subjects 1152-1162), and a part or all of a body of a message (e.g., message bodies 1164-1178). For example, timestamp 1140 may indicate a day, date and/or time in which a message (i.e., having subject 1152 and body 1164) was sent. In another example, timestamp 1140 may indicate an age of a message (i.e., number of hours, days, months, or the like, since the message was sent). Timestamps 1142-1150 may be implemented in a similar manner as described above with respect to timestamp 1140. In some examples, subjects 1152-1162 each may display a subject line from each of the messages represented in tiles 1124-1126, 1130-1134 and 1138, respectively. In some examples, subjects 1152-1162 may display text. In other examples, subjects 1152-1162 may display a graphic (i.e., logo, image, or other graphic). In some examples, message bodies 1164-1178 may include text, one or more graphics, hyperlinks (e.g., to or provided by a content provider, as part of an advertisement by a content provider, or the like), or other material from a body of a message. For example, message body 1164 may display a body of a message associated with subject 1152 and timestamp 1140, which has been cleaned of any personally identifiable and sensitive information. In some examples, message body 1164 may display an entire body of a clean version of the message. In other examples, message body 1164 may display a part or portion of a body of a clean version of the message. In some examples, tiles 1124-1138 may be laid out on shared environment 1102 as shown, with all or substantially all email messages on shared environment 1102 displayed in an open format, showing at least a part (i.e., a key or essential part (e.g., an image, a video, a significant portion of text, or the like)) or all of the clean content of the message. In other examples, tiles may be laid out differently on a website and are not limited to those shown and described.

In some examples, each of tiles 1124-1138 also may display an unsubscribe buttons (e.g., unsubscribe buttons 1196-1202), which may link (i.e., hyperlink) to another page (e.g., in a pop-up window, in a new tab in window 1100, in the same window (i.e., window 1100), in a separate window, or the like) configured to unsubscribe from a message. As used herein, "linking," "link to," and "hyperlink" refers to pointing a web browsing application to another address (i.e., URL) and retrieving and displaying content from that location. In an example, unsubscribe button 1196 may link to a page associated with a sender or source (i.e., content provider) of a message (i.e., a clean version, in whole or in part) displayed in tile 1124 for unsubscribing to emails from that sender. In another example, an invocation (e.g., by clicking, placing a cursor over, or otherwise selecting) of unsubscribe button 1196 may automatically unsubscribe a user (i.e., an account) from receiving email messages from a sender (i.e., of the message shown in tile 1124. Unsubscribe buttons 1198-1202 each may function similarly for the respective email messages shown in tiles 1128, 1132 and 1136. In still other examples, an unsubscribe button may be implemented differently and is not limited to those shown and described.

In some examples, each of tiles 1124-1138 also may display a comment icon (e.g., comment icons 1180-1186). In some examples, a comment icon may link to another page or website (e.g., in a pop-up window, in a new tab in window 1100, in the same window (i.e., window 1100), in a separate window, or the like) displaying comments associated with a message. For example, comment icon 1180 may link to another page or another website displaying comments associated with a message (i.e., a clean version, in whole or in part) displayed in tile 1124. Likewise, comment icons 1182-1186 may, respectively, link to pages or websites displaying comments associated with messages displayed in tiles 1128, 1132 and 1136. In other examples, a comment icon may link to another page or website providing a user interface for entering comments associated with a message. In yet other examples, a comment icon may be implemented differently and is not limited to those shown and described.

In some examples, each of tiles 1124-1138 also may display other icons for providing feedback (e.g., vote icons 1188-1194). As shown, vote icons 1188-1194 may be displayed as a graphic or image (i.e., Facebook's thumb-up graphic, Twitter's bird graphic, Google's Google+ logo, or other image) with a number next to it, the number indicating a vote count associated with a message shown in the respective tile (e.g., vote icon 1188 indicates the vote count for a message shown in tile 1124 (i.e., associated with subject 1152 and body 1164), vote icon 1190 indicates a vote count for a message shown in tile 1128 (i.e., associated with body 1168), and so on). A vote count may be a number of votes representing various types of feedback (e.g., "likes" on Facebook, pluses on Google+, number of times a message (i.e., a message displayed in the same tile as the graphic or image) is forwarded, or other feedback). In some examples, a vote count may indicate or represent the number of times a message was sent to other users (i.e., other accounts). In other examples, a vote count may indicate or represent a number of times the message has been forwarded from one user to another user. In still other examples, a vote count may indicate or represent a number of times the message has been posted, recommended, liked, shared or otherwise acted upon by a user to indicate a preference, or impression of, the message. In some examples, vote icons 1188-1194 may be implemented as icons or buttons that may be selected to automatically update or increment a vote count. In other examples, vote icons 1188-1194 may be implemented as hyperlinks that may be selected to link to another page, window or website configured to provide a user interface for indicating a vote. In still other examples, a vote icon may be implemented differently and is not limited to those shown and described.

In other examples, tiles 1124-1138 may include other features and display other information associated with a message. For example, other information may be shown or displayed in each tile (e.g., a sender, a link to a related message, or the like) (not shown). In another example, graphics, buttons or icons (not shown) may be included in tiles 1124-1138 (e.g., to delete a message, to indicate a user of a social network (e.g., Facebook, Google+, Twitter, or the like) that has recommended, commented, or otherwise provided feedback regarding a message, to prioritize or rearrange (i.e., change the order of) the message or similar messages, or the like). In still another example, graphics, buttons or icons (not shown) may be included in tiles 1124-1138, for example, to link to a website or page associated with a social network account (e.g., for a user, a user's friend, a celebrity that a user is following, or the like).

In some examples, shared environment 1102 may include share button 1106, which may be invoked (e.g., by clicking, placing a cursor over, or otherwise selected) to render and present a page configured for sharing one or more messages presented in tiles 1124-1136, or in other tiles published above or below tiles 1124-1136 (not shown). In some examples, sharing may include forwarding to another user, another email address, publishing (e.g., recommending, liking, posting, linking, or otherwise publishing) on a social network (e.g., Facebook, Twitter, Google+, or the like), for example, using access information associated with both an email account (i.e., provided by a system for electronic mail processing and publication) and a social network account. In other examples, a message published on shared environment 1102 may be shared using another hyperlink, icon or button (e.g., comment icons 1180-1186, vote icons 1188-1194, or the like) provided on the website, for example, on a tile posting a message. In still other examples, messages may be shared differently than described and shown herein.

In some examples, shared environment 1102 may display, or otherwise provide, other links, icons, and/or buttons associated with various functions, for example, linking to other pages associated with shared environment 1102. For example, shared environment may include filters 1108-1120 for filtering email messages published on shared environment 1102, for example, by subject matter. In some examples, each of filters 1108-1120 may be implemented as an icon, button, or other hyperlink, which may be invoked (e.g., by clicking, placing a cursor over, or otherwise selected) to show a subset of the messages published on shared environment 1102. For example, filter 1108 may be invoked to show only a subset of messages being associated with (e.g., categorized under, tagged as having subject matter regarding, or otherwise associated with) lifestyle in shared environment 1102. Similarly, filter 1110 may be invoked to show only a subset of messages being associated with humor in shared environment 1102. Also similarly, filters 1112-1120 may be invoked to show only a subset of messages being associated, respectively, with sports, technology, science, miscellaneous and favorites. In some examples, shared environment 1102 also may include search field 1122, which may provide a field for entering a query or term for searching, for example, data associated with messages being published on shared environment 1102. In some examples, search field 1122 may enable searching of other data associated with other messages. In still other examples, search field 1122 may be implemented differently (e.g., enable searching of a different data set, be a widget provided by a third party, or the like), and is not limited to those shown and described.

In some examples, tiles 1124-1138 may be sorted or prioritized according to various criteria. In some examples, a default criterion for prioritizing tiles 1124-1138 may be the ages of their respective messages. For example, tiles 1124-1138 may be prioritized from newest message to oldest message (i.e., timestamp 1140 indicates a more recent date and time, or a younger or lesser age (i.e., less time has passed since the message having subject 1152 and body 1164 was sent), than timestamp 1142, and so on). In other examples, tiles 1124-1138 may be prioritized according to recommendations from other users (e.g., the number of times a message is recommended or "liked" by a Facebook friend, the number of times a message has been posted or re-posted on Twitter, the number of times a message has been shared on Google+, or the like). In still other examples, tiles 1124-1138 may be prioritized according to other criteria specified by a user having access to shared environment 1102 (i.e., a user may customize the presentation or view of messages on their shared environment according to his or her preferences). For example, a page, widget or other user interface (i.e., as part of website 118) may be provided for a user to input or select preferences, including identifying or selecting one or more criteria for prioritizing email messages on their shared environment (e.g., shared environment 1102) or identifying interests (i.e., topics, subjects, hobbies, or the like) in order to receive targeted advertising or recommendations on content providers to which the user may want to subscribe. In some examples, a button or feature (not shown) may be provided on each tile for prioritizing an email or a group of emails (e.g., from a favored content provider, a school newsletter, or the like), for example to cause presentation of the email or group of emails in a high priority position (e.g., at the top of the page, in a designated or set-off section of the page, or the like) in the shared environment. In other examples, an email or message may be demoted, or otherwise designated as having lower priority, using the techniques described herein (e.g., a button, link, feature, preferences selection, or the like), for example to cause presentation of the email or message in a low priority position (e.g., lower in, or at the bottom of, the page, or the like). In still other examples, window 1100 and the above-described elements may be implemented differently in layout, design, function, structure, features, or other aspects and are not limited to the examples shown and described.

As described herein, shared environment 1102 may be configured to present information from marketing or other opt-in emails in an open format (i.e., without a need for clicking on an item or link from an email list to open a message), including graphics, images, videos, audio content, other dynamic content, or the like. As described herein, shared environment 1102 may be configured with buttons, links and other features for ease of managing email content, including a prominent unsubscribe button (e.g., unsubscribe buttons 1196-1202) and prioritization and demotion of messages for customizing presentation of message in shared environment 1102. In other examples, shared environment 1102 may include other features for managing email content. For example, shared environment 1102 may include a related content or "show me more" button (not shown) on each tile configured to provide (i.e., present) a user with similar content (e.g., advertisements, newsletters, or other content, associated with a brand, a product, a collection, a subject matter, or other category of items associated with a message presented in the tile). In another example, shared environment 1102 may include a link on a tile for purchasing an item offered by, or related to, an email message. In still other examples, the above-described elements may be implemented differently in layout, design, function, structure, features, or other aspects and are not limited to the examples shown and described.

In some examples, an application for email processing and publication on shared environment 1102 (e.g., application 200 in FIG. 2) may be configured to gather, organize, process and/or store data (i.e., "track" data) associated with user preferences and activity (i.e., actions on, or interactions with, shared environment 1102), as described above. For example, a variety of types of data associated with messages displayed on shared environment 1102, including a user's activity, may be tracked for use in targeting advertisements and other subscription emails that may be of interest to a user. Activity data may include types of (i.e., subjects, products, brands, interests, or other aspects of content in) emails subscribed to, unsubscribed from, prioritized, demoted, liked by friends, linked to, viewed many times, viewed for long periods of time, trends indicated by such activity, or other metrics. Such activity data may be processed to determine trends, patterns, or other useful information about a user (e.g., buying patterns, media (e.g., books, video, music, and the like) preferences, interests, hobbies, and the like). In some examples, targeted advertisements or subscription email suggestions (e.g., newsletters, marketing emails, or other opt-in emails that may be of interest to a user) may be determined and provided to a user based upon activity data associated with the user's account. In other examples, targeted advertisements or subscription email suggestions may be determined and provided to a user based upon activity data associated with one or more groups or a plurality of users. In some examples, activity data may be used by an application for email processing and publication on shared environment 1102 (e.g., application 200 in FIG. 2) to provide targeted advertisements or subscription email suggestions to a user. In other examples, such activity data may be shared with, or provided to, content providers for their use in targeting advertisements, marketing emails, newsletters and the like. For example, activity data indicating a user subscribes to, prioritizes, and/or has friends that like, a string instrument newsletter may cause an application for email processing and publication on shared environment 1102 (e.g., application 200 in FIG. 2) or a content provider to target an advertisement for a hand cream to the user. In still other examples, data associated with an application for email processing and publication on shared environment 1102 may be used differently and are not limited to the examples shown and described.

In some examples, shared environment 1102 may be configured for display or presentation on a mobile client or device. For example, shared environment 1102 may be displayed using a mobile application or mobile web browser installed on a mobile computing or communications device. In some examples, an application for email processing and publication on shared environments (e.g., application 200 in FIG. 2) may be configured to process content (e.g., video, audio, text, image, or other data) in a subscription email from a content provider for presentation in a shared environment on a mobile application or mobile web browser. In some examples, an application for email processing and publication on shared environments (e.g., application 200 in FIG. 2) may be configured (i.e., using HTML5 or other language or program for structuring and presenting content on a web application or browser) to detect a type of mobile computing or communications device, and to render content based on the type of mobile computing or communications device. In other examples, the above-described elements may be implemented differently in layout, design, function, structure, features, or other aspects and are not limited to the examples shown and described.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method, comprising:
   creating an account via selection of a link in an electronic mail for a different email account;
   receiving, at a computer server being configured to receive electronic mail, electronic mail associated with a domain, the electronic mail comprising a plurality of messages, each of the plurality of messages indicating an address being associated with the account;
   modifying a header associated with each of the plurality of messages by using a processing engine to insert a subject line associated with each of the plurality of messages into the header data structure associated with each of the plurality of messages, the subject line being implemented as a header tag to enhance search engine optimization based on at least a portion of the subject line and as a title tag configured to facilitate display of a subset of the plurality of messages based on a categorical reference;
   identifying, using the computer server, the account with which the address is associated;
   generating, using the computer server, a clean version of each of the plurality of messages by parsing each of the plurality of messages to remove data representing identification information, at least one clean version of a message including a respective subject line and a body, the message being one of the plurality of messages;
   publishing, using the computer server, on a computer display the clean version of each of the plurality of messages on a shared environment presented on the computer display in an arrangement based on one or more of the title tag and the header tag and associated message data to form a portion of a general mailbox including aggregated electronic mail, wherein the shared environment comprises one or more hyperlinks associated with corresponding clean versions of each of the plurality of messages;
   receiving data associated with a keyword in a search; and
   causing the shared environment to change on the computer display based on matching the keyword to at least another one or more of the title tag and the header tag, the computer display being configured to display one or more other clean versions associated with other hyperlinks of other messages drawn from the plurality of messages and to display at least a portion of the clean version of one of the plurality of messages associated with the matched keyword in the shared environment, the shared environment being accessible using access information associated with the account.

2. The method of claim 1, further comprising storing, using the computer server, the clean version of each of the plurality of messages in a database, the clean version being associated with the account.

3. The method of claim 1, further comprising determining and storing, using the computer server, a vote count associated with each of the plurality of messages, the vote count determined according to a number of times the message was forwarded.

4. The method of claim 1, further comprising determining and storing, using the computer server, a vote count associated with each of the plurality of messages, the vote count determined according to a number of times the message received a vote on a social network.

5. The method of claim 1, further comprising registering, using the computer server, the account using the access information.

6. The method of claim 1, wherein the electronic mail is received into a catch all mailbox associated with the domain.

7. The method of claim 1, wherein the message is received into a mailbox configured to receive electronic mail addressed to the address using Simple Mail Transfer Protocol.

8. The method of claim 1, wherein the data representing the identification information comprises personally identifiable information from the electronic mail.

9. The method of claim 1, wherein the account is associated with a social network account.

10. The method of claim 1, wherein the access information is associated with a social network account.

11. The method of claim 1, wherein the publishing the clean version of each of the plurality of messages includes providing, using the computer server, an unsubscribe button on a tile displaying text from the clean version.

12. The method of claim 1, wherein the publishing the clean version of each of the plurality of messages includes displaying, using the computer server, a graphic indicating a vote count associated with the message.

13. The method of claim 1, wherein the clean version of each of the plurality of messages is published on the shared environment in a prioritized fashion according to a criterion.

14. The method of claim 1, wherein the shared environment includes a share button.

15. The method of claim 1, wherein the electronic mail is received from a content provider using an application programming interface.

16. The method of claim 1, further comprising:
    tracking, using the computer server, activity data; and
    providing, using the computer server, a targeted advertisement using the activity data.

17. The method of claim 1, wherein displaying at least a portion of the clean version of each of the plurality of messages comprises displaying, using the computer server, dynamic content in a tile.

18. A system, comprising:
    a database configured to store data associated with an electronic message and a shared environment, the electronic message and the shared environment being associated with an account; and
    a computer server being configured to implement:
        a logic module being configured to create an account via selection of a link in an electronic mail for a different email account, to receive electronic mail associated with a domain, the electronic mail comprising a plurality of messages, each of the plurality of messages indicating an address being associated with the account, to modify a header associated with each of the plurality of messages by using a processing engine to insert a subject line associated with each of the plurality of messages into the header data structure associated with each of the plurality of messages, the subject line being implemented as a header tag to enhance search engine optimization based on at least a portion of the subject line and as a title tag configured to facilitate display of a subset of the plurality of messages based on a categorical reference, to identify the account with which the address is associated, to generate a clean version of each of the plurality of messages by parsing each of the plurality of messages to remove data representing identification information, at least one clean version of a message including a respective subject line and a body, the message being one of the plurality of messages, and a posting module being configured to publish the clean version of each of the plurality of messages on a shared environment presented on a computer display in an arrangement based on one or more of the title tag and the header tag and associated message data to form a portion of a general mailbox including aggregated electronic mail, wherein the shared environment comprises one or more hyperlinks associated with corresponding clean versions of each of the plurality of messages, the posting module being configured further to receive data associated with a keyword in a search and to cause the shared environment to change on the computer display based on matching the keyword to at least another one or more of the title tag and the header tag, the computer display being configured to display one or more other clean versions associated with other hyperlinks of other messages drawn from the plurality of messages and to display at least a portion of the clean version of one of the plurality of messages associated with the matched keyword in the shared environment, the shared environment being accessible using access information associated with the account.

19. The system of claim 18, wherein the logic module being further configured to register the account using the access information, the access information being associated with a social network account.

* * * * *